(12) United States Patent
Treiber et al.

(10) Patent No.: US 6,324,062 B1
(45) Date of Patent: Nov. 27, 2001

(54) MODULAR PACKAGING CONFIGURATION AND SYSTEM AND METHOD OF USE FOR A COMPUTER SYSTEM ADAPTED FOR OPERATING MULTIPLE OPERATING SYSTEMS IN DIFFERENT PARTITIONS

(75) Inventors: Mark R. Treiber, Philadelphia; Peter P. Klein, Huntington Valley; N. Kenneth Newman, Hatfield; Grant M. Smith, Bryn Athyn, all of PA (US)

(73) Assignee: Unisys Corporation, PA (US)

( * ) Notice: Subject to any disclaimer, the term of this patent is extended or adjusted under 35 U.S.C. 154(b) by 0 days.

(21) Appl. No.: 09/285,814

(22) Filed: Apr. 2, 1999

(51) Int. Cl.$^7$ ................................ G06F 1/16; H05K 5/02
(52) U.S. Cl. .................. 361/727; 361/686; 361/684; 312/223.2
(58) Field of Search ........................ 361/684, 686, 361/724, 725, 726, 727, 788, 796, 685; 312/223.1, 223.2, 265.2, 334.31

(56) References Cited

U.S. PATENT DOCUMENTS

| | | | |
|---|---|---|---|
| 4,918,572 | 4/1990 | Tarver et al. ................. | 361/395 |
| 5,112,119 * | 5/1992 | Cooke et al. ................. | 312/283 |
| 5,227,957 | 7/1993 | Deters . | |
| 5,278,730 * | 1/1994 | Kikinis ........................ | 361/686 |
| 5,329,579 | 7/1994 | Brunson . | |
| 5,353,412 | 10/1994 | Douglas et al. . | |
| 5,379,184 | 1/1995 | Barraza et al. . | |
| 5,450,271 * | 9/1995 | Fukushima et al. .......... | 361/686 |
| 5,486,982 | 1/1996 | Hsu . | |
| 5,517,656 | 5/1996 | Shi . | |
| 5,544,008 | 8/1996 | Dimmick et al. ............. | 361/684 |
| 5,581,778 | 12/1996 | Chin et al. . | |
| 5,590,283 | 12/1996 | Hillis et al. . | |
| 5,604,662 | 2/1997 | Anderson et al. . | |
| 5,619,486 * | 4/1997 | Uno et al. .................... | 369/75.1 |
| 5,668,696 * | 9/1997 | Schmitt ........................ | 361/685 |
| 5,710,935 | 1/1998 | Barker et al. . | |
| 5,734,921 | 3/1998 | Dapp et al. . | |
| 5,784,646 | 7/1998 | Sawada . | |
| 5,802,366 | 9/1998 | Row et al. . | |
| 5,809,533 | 9/1998 | Tran et al. . | |
| 5,828,547 * | 10/1998 | Francovich .................. | 361/685 |
| 5,854,904 | 12/1998 | Brown . | |
| 5,862,149 | 1/1999 | Carpenter et al. . | |
| 5,867,723 | 2/1999 | Chin et al. . | |
| 6,016,252 | 1/2000 | Pignolet et al. ............. | 361/724 |
| 6,175,490 * | 1/2001 | Papa et al. .................. | 361/686 |

FOREIGN PATENT DOCUMENTS

29613822U1   1/1997   (DE) .

* cited by examiner

*Primary Examiner*—Leo P. Picard
*Assistant Examiner*—Lisa Lea-Edmonds

(57) ABSTRACT

A packaging configuration is provided for a computer system that is adapted for operating multiple operating systems in different partitions of the computer system. The packaging configuration includes a main chassis having a main circuit board. The packaging configuration also includes a processor assembly configured for insertion into the main chassis. The processor assembly has a circuit board for connection to the main circuit board upon insertion of the processor assembly. The packaging configuration also includes a processor subassembly configured for insertion into the processor assembly. The processor subassembly includes a circuit board and a processor and is configured for connection with a circuit board in the processor assembly upon insertion of the processor subassembly. The processor assembly is removable from the main chassis without powering down the computer system, and the processor subassembly is removable from the processor assembly without powering down the computer system.

47 Claims, 19 Drawing Sheets

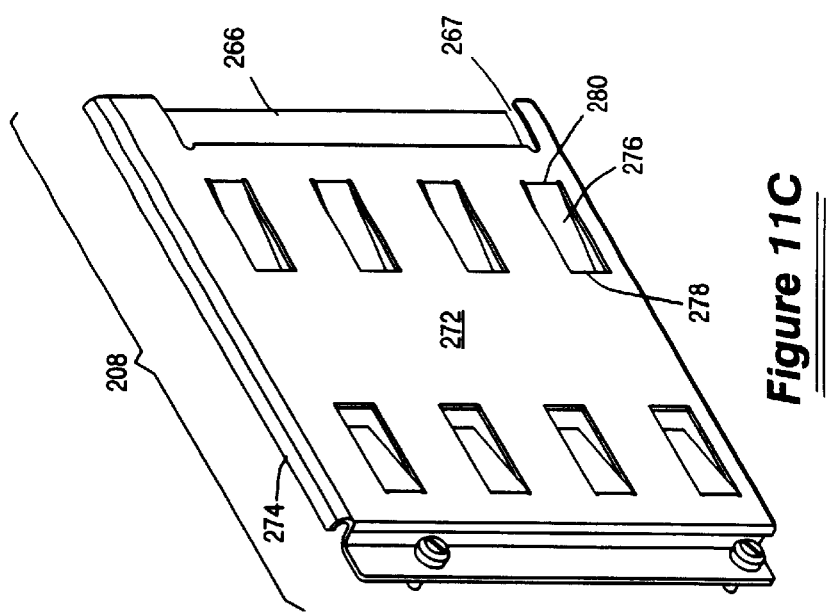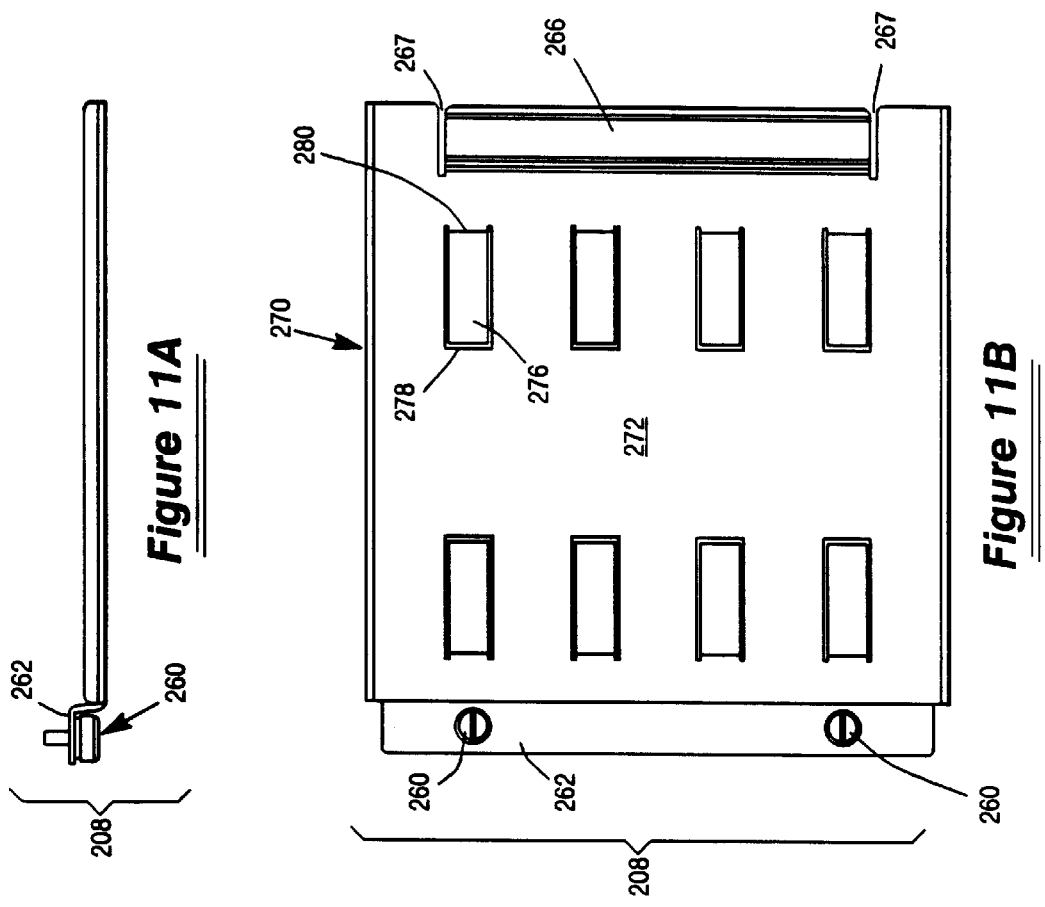

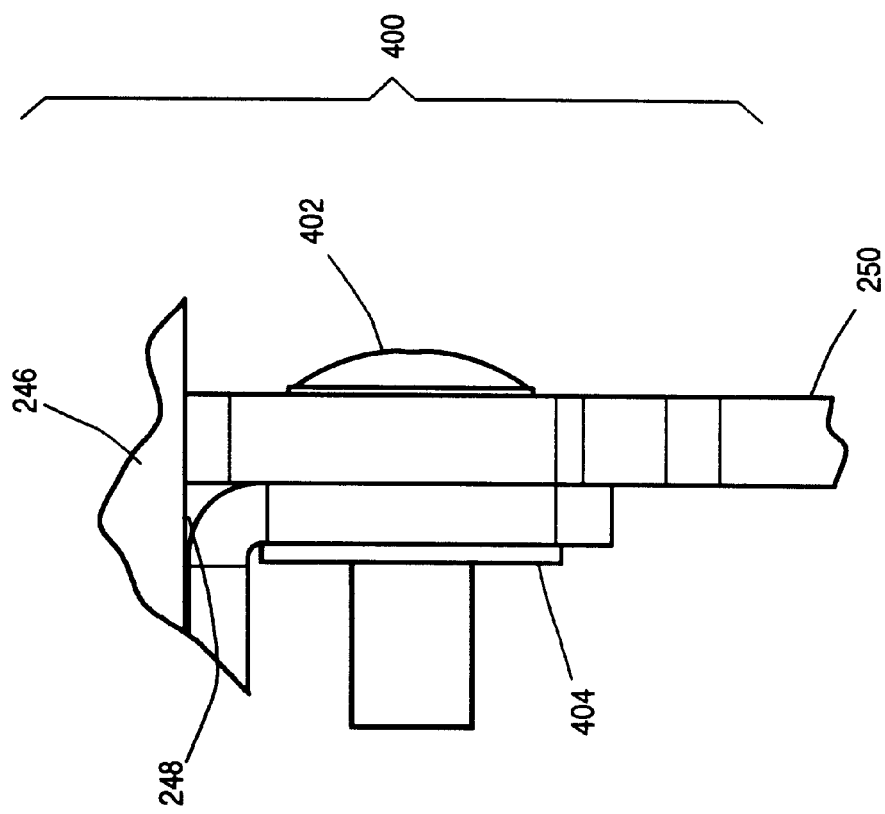

MODULAR PACKAGING CONFIGURATION AND SYSTEM AND METHOD OF USE FOR A COMPUTER SYSTEM ADAPTED FOR OPERATING MULTIPLE OPERATING SYSTEMS IN DIFFERENT PARTITIONS

FIELD OF THE INVENTION

The present invention relates generally to packaging configurations for computer systems and, more particularly, to a packaging configuration for a computer system that can operate multiple operating systems in different partitions on the computer system and that can allow the different partitions to communicate with one another through shared memory.

A computer system typically includes a processor, main memory, and input/output (I/O) devices (e.g., printers, network interfaces, graphic display interfaces). The computer system uses an addressing scheme to designate the source or destination of an item of data. Memory management functions, including the accessing of data, as well as other management functions, are controlled at least in part by an operating system. There are a variety of operating systems on the market, each having their own unique characteristics and capabilities. Conventional computer systems typically employ a single operating system.

As modern computer systems grow, and the demands of the computer user increases, the necessity of employing a plurality of operating systems increases. A plurality of operating systems, however, substantially increases the complexity of the computer system.

In order to meet the demands of the computer user by employing a plurality of operating systems, a computer system has been discovered that can allow multiple operating systems, including different operating systems, to operate in different partitions on the computer system. The computer system can be adapted to allow the different partitions, including the operating systems and other clients running in the different partitions, to communicate with one another through a shared memory. Needed in connection with such a computer system is a packaging configuration that is well adapted to contain a partitionable computer system.

SUMMARY OF THE INVENTION

In order to provide a packaging configuration that is well adapted to house a partitionable computer system, a modular configuration has been discovered. According to one aspect of this invention, a method is provided for use in a computer system having processing modules and operating systems with a shared memory that is housed in a chassis. The method includes providing a removable pod and receiving the pod within the chassis and coupling the pod to the shared memory. A removable sub-pod is provided having a processing module and the sub-pod is received within the pod and coupled to the pod. The method also includes configuring groups of at least one sub-pod as separate partitions within the computer system and assigning each of the separate partitions to a separate operating system. Program code is provided for executing on the separate partitions and enabling the communication of the separate partitions with each other through the shared memory. The method includes the step of removing the at least one sub-pod of a group from a pod and thereby disabling the separate partition under which the removed sub-pod group operates without interrupting the execution of the program code on the remaining at least one separate partition. A corresponding computer system is also provided.

According to another aspect of this invention, a processor subassembly or "sub-pod" is provided with a chassis at least partially defining an interior and an opening for access to the interior. The chassis includes a support and a circuit board mounted to the chassis and positioned at least partially within the interior of the chassis. A processor is provided within the interior of the chassis, and the processor is releasably connected to the circuit board, wherein the processor is positioned adjacent to the support and has an edge portion in contact with the support. The chassis is configured for insertion into and removal from a computer system chassis to facilitate releasable interconnection between the circuit board of the sub-pod and a circuit board of the computer system.

According to another aspect of this invention, a processor assembly or "pod" is provided with a configuration for releasable connection within a computer system. The pod includes a chassis at least partially defining an interior and an opening for access to the interior. The pod also includes a circuit board mounted to the chassis and positioned within the interior of the chassis, wherein the circuit board includes a connector. Also included in the pod is a sub-pod that is configured for releasable connection within the interior of the pod's chassis. The sub-pod's chassis has a cross-sectional shape perpendicular to the insertion axis corresponding substantially to the shape of the pod's opening, thereby promoting alignment and proper interconnection of the sub-pod's connector and the pod's circuit board as the sub-pod is inserted.

According to another aspect of this invention, a chassis assembly for a pod is provided that is configured for releasable connection within a computer system and is configured to receive a sub-pod. The chassis assembly includes a chassis at least partially defining an interior and an opening for access to the interior. The chassis assembly also includes a circuit board mounted at least partially within the interior of the chassis in juxtaposition with the opening of the chassis. The circuit board includes a connector for connection to a computer system's circuit board as well as a connector for connection to a sub-pod circuit board. The chassis is configured for sliding insertion into an opening of a computer system's chassis for connection between a connector and a computer system circuit board. The chassis is also configured to receive in the opening a sub-pod for connection between a connector and a sub-pod circuit board.

According to another aspect of this invention, a packaging configuration for a computer system is provided with a main chassis defining an opening and an interior and having a main circuit board such as a midplane mounted in juxtaposition with the interior. The packaging configuration also includes a pod having a chassis configured for sliding insertion into the interior of the main chassis for making interconnection between the pod's circuit board and the main circuit board upon sliding insertion of the pod's chassis into the interior of the main chassis. The packaging configuration also includes a sub-pod having a chassis configured for sliding insertion into an opening in the chassis of the pod. The sub-pod is configured for making interconnection between a circuit board in the sub-pod and the circuit board of the pod upon sliding insertion into the interior of the pod.

According to another aspect of this invention, a modular computer system includes a chassis containing a memory storage unit mounted within an interior of the chassis. The modular computer system also includes a pod configured for insertion into the chassis, wherein the pod includes an electronic switch for connection to the memory storage unit in the chassis. The modular computer system also includes sub-pods configured for insertion into the pod, wherein each of the sub-pods includes a processor and cache memory connected to the processor. Each of the sub-pods being connected to the switch in the pod upon insertion, and each of the sub-pods being separately removable from the pod for disconnection from the switch without powering down the computer system. The pod is also removable from the interior of the chassis for disconnection from the memory storage unit without powering down the computer system.

According to yet another aspect of this invention, the sub-pod includes a chassis, a circuit board, and a processor mounted within the interior of the chassis. The sub-pod includes a cover that is configured for releasable engagement to the chassis. The cover is positioned adjacent to the processor and includes an integral spring portion positioned for contact with the processor. The integral spring portion is configured to apply a compressive force against the processor, thereby urging the processor toward the circuit board to maintain the connection between the processor and the circuit board.

BRIEF DESCRIPTION OF THE FIGURES.

FIGS. 11A, 11B, and 11C are views of a cover assembly adapted for use in the processor subassembly illustrated in FIGS. 9A, 9B, and 9C.

FIG. 14A is a top view of the fastener assembly illustrated in FIG. 13.

DETAILED DESCRIPTION OF THE PREFERRED EMBODIMENTS

The following description is provided to illustrate preferred embodiments of the invention. This description is not intended to limit the scope of the invention, which is defined separately in the appended claims.

The present invention is directed to a packaging configuration for a multi-processor computer system having one or more processor modules and a main memory having one or more memory storage units. The system allows a plurality of operating systems to concurrently execute in different partitions within the computer system and allows the different partitions to communicate with one another through shared memory. Further details relating to a partitionable computer system, for which this packaging configuration is adapted, are provided in application Ser. No. 09/215,424 filed Dec. 18, 1998, titled "Computer System and Method for Operating Multiple Operating Systems in Different Partitions of the Computer System and for Allowing the Different Partitions to Communicate with one Another Through Shared Memory," which is incorporated herein by reference in its entirety.

Generally, the computer system can be used as a server and includes a main memory including memory storage units and processor assemblies ("pod modules" or "pods"). Each pod module includes processor subassemblies ("sub-pod modules" or "sub-pods"). And each sub-pod module includes processors. In one preferred configuration, the computer system can include four memory storage units and four pod modules, each pod module can include two sub-pod modules, and each sub-pod module can include four processors. Thus, in this configuration, the computer system contains 32 processors. Other configurations are contemplated as well. For example, a smaller configuration can include a single pod module and two sub-pod modules, connected to a memory storage unit.

The computer system or server can be logically partitioned on both pod and sub-pod boundaries. Each partition can operate under the control of its own operating system. For example, in a configuration in which two partitions are defined, one partition can run under the control of the Windows NT operating system marketed by Microsoft Corporation while the other partition executes a UNIX operating system. With a larger configuration with four pods, each sub-pod can be configured as a separate partition to provide a total of eight partitions.

As used herein, the term "computer system" refers to hardware, including electronic and mechanical components, and to software, including application programs and operating systems. Generally, operating systems include instructions and data that a computer system manipulates in order to perform tasks. The term "operating system" refers to the program code that controls and coordinates the use of the hardware among the various application programs for various users. The term "computer architecture" refers to the structure and behavior of a computer system as viewed by the user.

Figure 1:
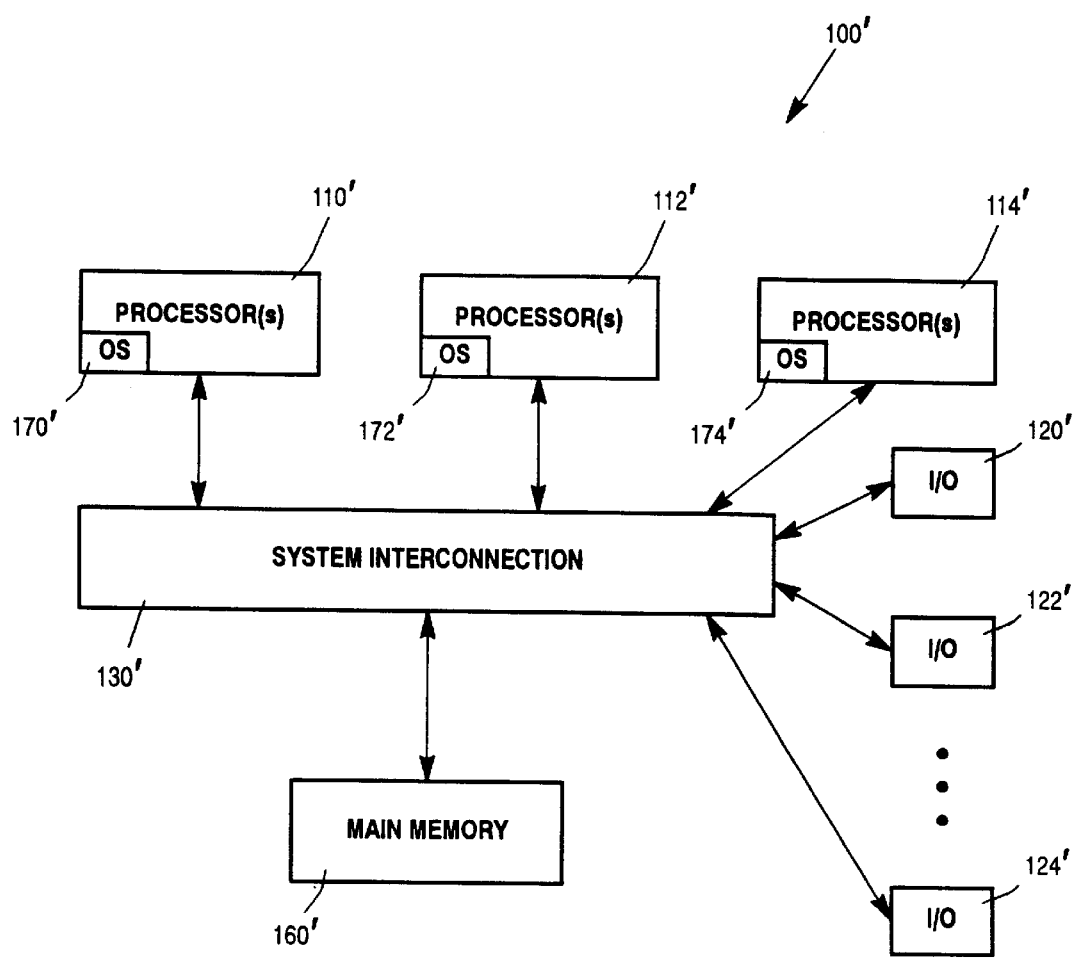
FIG. 1 is a block diagram of an embodiment of a computer environment for which a packaging configuration according to this invention can be used.

Features of a preferred embodiment of the computer system will now be illustrated with reference to the block diagrams provided in FIGS. 1–3. FIG. 1 illustrates a multi-processor system that includes processor modules 110', 112', and 114'. Processor modules 110', 112', and 114' are of comparable compatibility. However, heterogeneous processors and/or operating systems can co-exist. Each processor module 110', 112' and 114' is self-contained. The processor modules 110', 112' and 114' can each include a plurality of processors. Two or more of processor modules 110', 112' and 114' share access to main (or global) memory 160' and/or to I/O devices 120', 122', and 124', typically through a system interconnection mechanism, such as system interconnection 130'. Processor modules 110', 112', and 114' can communicate with each other through main memory 160'(by messages and status information left in common data areas).

One or more processor modules may be configured as a separate partition within the computer system, such that multiple partitions may exist within the computer system, each partition operating under the control of a separate operating system. For example, each processor module 110', 112', and 114' of FIG. 1 can be defined as a separate partition controlled via a separate operating system 170', 172', and 174'. Each operating system 170', 172', and 174' views main memory separately as though each is the only entity accessing main memory 160'.

Figure 2:
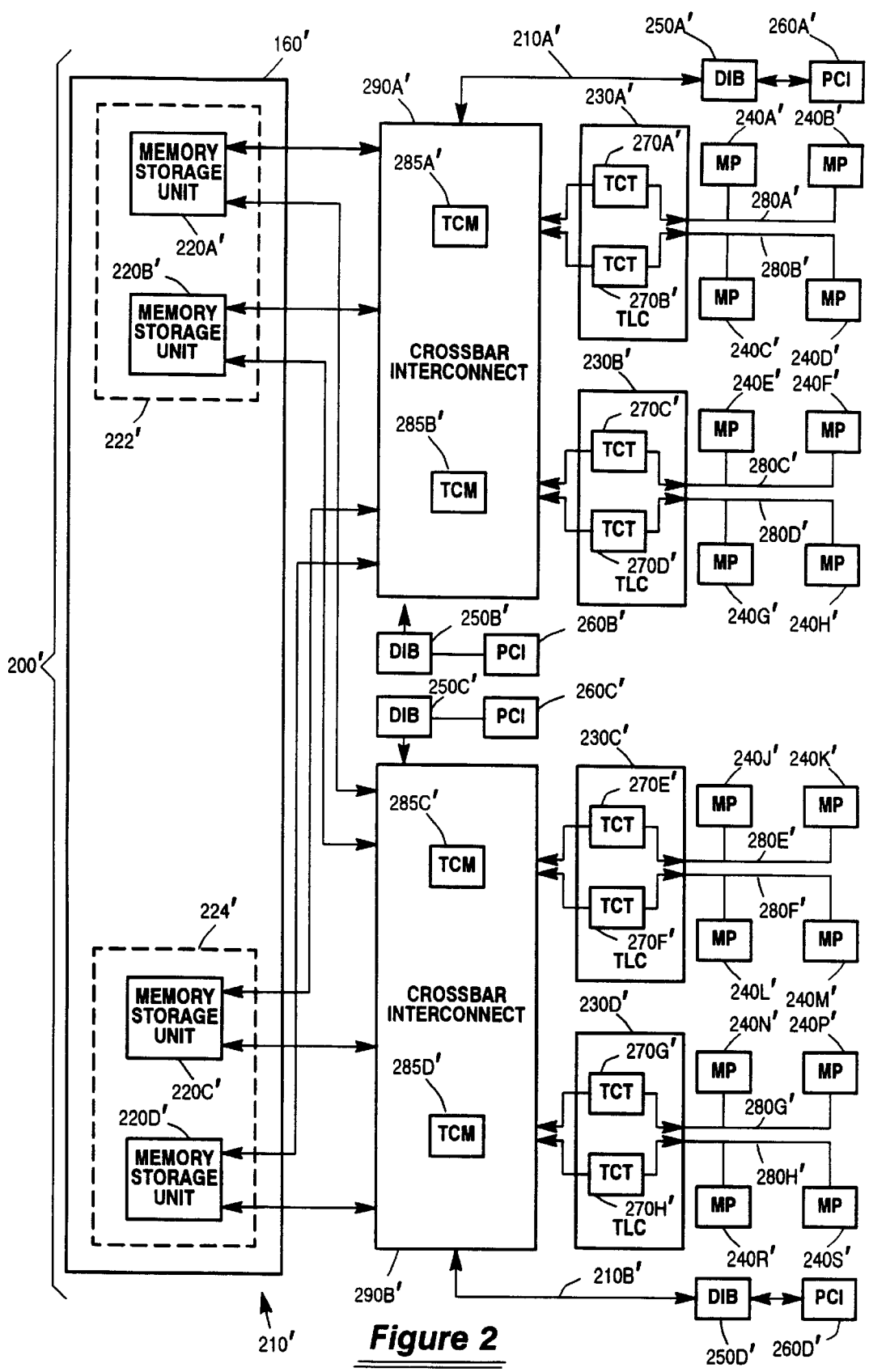
FIG. 2 is a block diagram of an embodiment of a computer system for which a packaging configuration according to this invention can be used.

FIG. 2 is a detailed illustration of a preferred embodiment of a computer system 200'. Computer system 200' includes a main memory, illustrated here as main memory 160', and a plurality of processing modules 240' connected to the main memory via respective third level cache modules 230' and crossbar interconnects 290'. In this embodiment, the processing modules and the main memory are arranged in a symmetrical multiprocessing architecture, i.e., processor-to-memory latency is the same for each processing module across all of the main memory.

In the present embodiment, main memory 160' is a directory-based memory system and is capable of supporting various memory consistency models such as, for example, memory consistency models employed on UNIX/NT systems. Main memory 160' includes a plurality of memory storage units (MSUs) 220', such as memory storage units 220A', 220B', 220C', and 220D'. Preferably, each memory storage unit 220A', 220B', 220C', and 220D'includes at least eight gigabytes of memory. Preferably, each memory storage unit 220A', 220B', 220C', and 220D' includes sixteen semi-independent banks that share four double-wide data buses and eight unidirectional address buses.

The plurality of third level cache modules 230', such as third level cache modules 230A' through 230D', include a plurality of third level cache application specific integrated circuits (or TCTs), such as TCTs 270A' through 270H'. In the present embodiment, pairs of processors (e.g., 240A' and 240B') share a common bus (e.g., 280A') with a single TCT (e.g., 270A') within a given TLC (e.g., 230A'). Each TCT 270' performs address relocation, reclamation, and translation for memory addresses issued by the processors to which it is connected, as described more fully below.

Each third level cache module 230A' through 230D' is connected to a respective plurality of processors (MPs) 240A' through 240S'. Specifically, in the present embodiment, each TLC 230' is connected to four processors. Each TLC 230' and its respective four processor define a "sub-pod." Further according to the present embodiment, two sub-pods are connected via a crossbar interconnect (e.g., crossbar interconnect 290A' or 290B') to form "a pod."Thus, in the embodiment illustrated in FIG. 2, there are four sub-pods connected via crossbar interconnects 290A' and 290B', respectively, to form two pods.

Crossbar interconnects 290' interface processors 240', through third level caches 230', with memory storage units 220'. Crossbar interconnects 290' employ a crossbar memory approach, whereby a plurality of cross points are placed at intersections between the processors 240' and memory storage units 220'. Within the cross point is a switch that determines the path from a processor bus 280' to a memory storage unit 220'. Each switch point has control logic to set up the transfer path between a processor 240' and main memory 160'. The control logic examines the address that is placed on processor bus 280' to determine whether its particular memory storage unit 220' is being addressed. The control logic also resolves multiple requests for access to the same memory storage unit 220' on a predetermined priority basis. Each crossbar interconnect 290' further comprises a pair of Third-Level-Cache Memory Interface application specific integrated circuits (TCMs) 285', which perform address relocation, reclamation, and translation for memory requests from I/O devices.

Computer system 200' further includes I/O buses 210A' through 210D' and a plurality of peripheral component interconnects (PCIs), such as PCIs 260A' through 260D' that are connected via direct I/O bridges, such as direct I/O bridges (DIB) 250A' through 250D'.

In operation, memory storage units 220' bi-directionally communicate with third level cache modules 230', through crossbar interconnects 290'. Crossbar interconnects 290' bi-directionally communicate with direct I/O bridges 250' via I/O buses 210', and with processors 240' through TCTs 270'. Direct I/O bridges 250' bi-directionally communicate with peripheral component interconnects 260'.

In the present embodiment, the processors (MPs) 240 may comprise Intel processors (e.g., Pentium Pro, Pentium II Xeon, Merced), Unisys E-mode style processors (used in Unisys A Series and Clearpath HMP NX enterprise servers), or Unisys 2200 style processors (used in Unisys 2200 and Clearpath HMP IX enterprise servers). Preferably, a given sub-pod employs four processors of the same type. However, the present invention contemplates that different sub-pods may employ different types of processors. For example, one sub-pod may employ four Intel processors, while another sub-pod may employ four Unisys E-mode style processors. In such a configuration, the sub-pod that employs Intel processors may be defined as one partition and may run under the control of an Intel-compatible operating system, such as a version of Unix or Windows NT, while the sub-pod that employs Unisys E-mode style processors may be defined as another partition and may run under the control of the Unisys MCP operating system. As yet another alternative, the sub-pods in two different partitions may both employ Intel processors, but one partition may run under the control of an Intel compatible operating system (e.g., Windows NT), while the other partition may run under the control of the Unisys MCP operating system through emulation of the Unisys A Series computer architecture on the Intel processors in that partition.

Additional details of the architecture of the preferred embodiment of the computer system 200' of FIG. 2 are provided in the following co-pending, commonly assigned applications, each of which is incorporated by reference herein in its entirety:

"A Directory-Based Cache Coherency System," Ser. No. 08/965,004, filed Nov. 5, 1997; "Split Lock Operation To Provide Exclusive Access To Memory During Non-Atomic Operations," Ser. No. 08/964,623, filed Nov. 5, 1997; "Message Flow Protocol for Avoiding Deadlocks," Ser. No.

08/964,606, filed Nov. 5, 1997; "Memory Optimization State," Ser. No. 08/964,626, filed Nov. 5, 1997; "System and Method For Providing Speculative Arbitration For Transferring Data," Ser. No. 08/964,630, filed Nov. 5, 1997; "High Performance Modular Memory System with Crossbar Connection," Ser. No. 09/001,592, filed Dec. 31, 1997; "Programmable Address Translation System," Ser. No. 09/001,139, filed Dec. 31, 1997; "High-Speed Memory Storage United for a Multiprocessor System Having Integrated Directory and Data Storage Subsystem," Ser. No. 09/001,588, filed Dec. 31, 1997; "Directory Based Cache Coherency System Supporting Multiple Instruction Processor and Input/Output Caches," Ser. No. 09/001,598, filed Dec. 31, 1997; "Bi-directional Interface Distributed Control Mechanism," Ser. No. 09/096,624, filed Jun. 12, 1998; "Source Synchronous Transfer Scheme," Ser. No. 09/097,287, filed Jun. 12, 1998; and "Queuing Architecture for Use in a Data Processing System Having Independently-Operative Data & Address Interfaces," Ser. No. 09/096,822, filed Jun. 12, 1998.

As mentioned above, in accordance with the present invention, computer system 200' is partitionable on pod and sub-pod boundaries. In FIG. 3, a portion 2801' of computer system 200' is illustrated including pod and sub-pod boundaries. A pod 2802' includes crossbar interconnect 290A', a first sub-pod 2804A', and a second sub-pod 2804B'. Sub-pods 2804A' and 2804B' are substantially similar to one another. Sub-pod 2804A', for example, includes third level cache 230A', which includes TCTs 270A' and 270B'. Sub-pod 2804' further includes processors 240A'–240D'. Pod 2802' thus includes two TLCs 230', four TCTs 270', eight processors 240' and a crossbar interconnect 290'.

In the present embodiment, a maximum configuration of the computer system 200' includes four pods 2802', each pod 2802' including two sub-pods 2804', as described above. Thus, in the maximum configuration, computer system 200' includes (4 pods)*(8 processors per pod)=32 processors. Computer system 200' can be partitioned on any combination of pod or sub-pod boundaries. It is understood, however, that the present invention contemplates other multiprocessing environments and configurations. For example, computer system 200' could be expanded by plugging in more memory storage units 220' and more pods or sub-pods.

In an embodiment, pod 2802' is defined to include direct I/O bridges 250A' and 250B'. In an embodiment, sub-pods 2804' and 2806' are defined to include direct I/O bridges 250A' and 250B', respectively. Further according to the present invention, multiple partitions within the computer system, each of which may comprise one or more pods or sub-pods, each operates under the control of a separate operating system. The operating systems executing on the different partitions may be the same or different. For example, the present invention contemplates an environment wherein at least two of the operating systems are different and one operating system does not control or manage the second operating system.

Features of a memory configuration that can be generated on the computer system of FIG. 2 will now be described, in accordance with the partitionability feature of the present invention. In this example, each of three operating systems (OS) has its own address space (i.e., the physical address spaces of the respective processing modules on which those operating systems execute). The main memory also has an address space. Three exclusive memory windows, one for each operating system (i.e., partition), and one shared memory window, which is accessible by all three operating systems (i.e., partitions), can be defined within the address space of the main memory.

Preferred embodiments of a packaging configuration, adapted for use in connection with a computer system such as the computer system illustrated in FIGS. 1–3, will now be described. Generally, a preferred embodiment of the packaging configuration according to this invention includes a main circuit board or "midplane," a processor assembly or pod module, and a processor subassembly or sub-pod module. The pod module is a carrier, preferably formed from sheet metal, for a processor assembly circuit board or "mezzanine board" that connects to the midplane. The pod module contains interface circuits and is "hot swappable" for live insertion. In other words, the pod module can be removed and inserted as a field replaceable unit (FRU) without powering-down the system.

Each pod module can accept two sub-pod modules, each of which carries four processors. In the preferred computer system configuration, four pod modules would be attached to the midplane and two sub-pod modules would be attached to the mezzanine board of each pod module. The pod modules provide the hot swap capability for the two sub-pods. In other words, while a pod module is connected to the midplane, one or both of the sub-pod modules within it can be removed from the pod module without having to terminate power to the entire system. Accordingly, a hierarchical mechanical packaging system is provided to support the local partitioning of the computer system or server architecture.

Preferred embodiments of a mechanical packaging configuration will now be described with reference to FIGS. 4–16. It will be appreciated that the scope of this invention is not limited to the particular embodiments selected for illustration in the drawings and described herein for the purpose of illustration. It will also be appreciated that the drawings are not made to any particular scale or proportion and that a variety of sizes and shapes are contemplated for the assemblies and components described herein. Furthermore, it will be appreciated that the packaging configuration according to this invention, although well adapted for use with a partitionable computer system such as computer system 200' shown in FIG. 2, is adaptable for use with a wide variety of computer systems and a wide variety of computer architectures.

Figure 4:
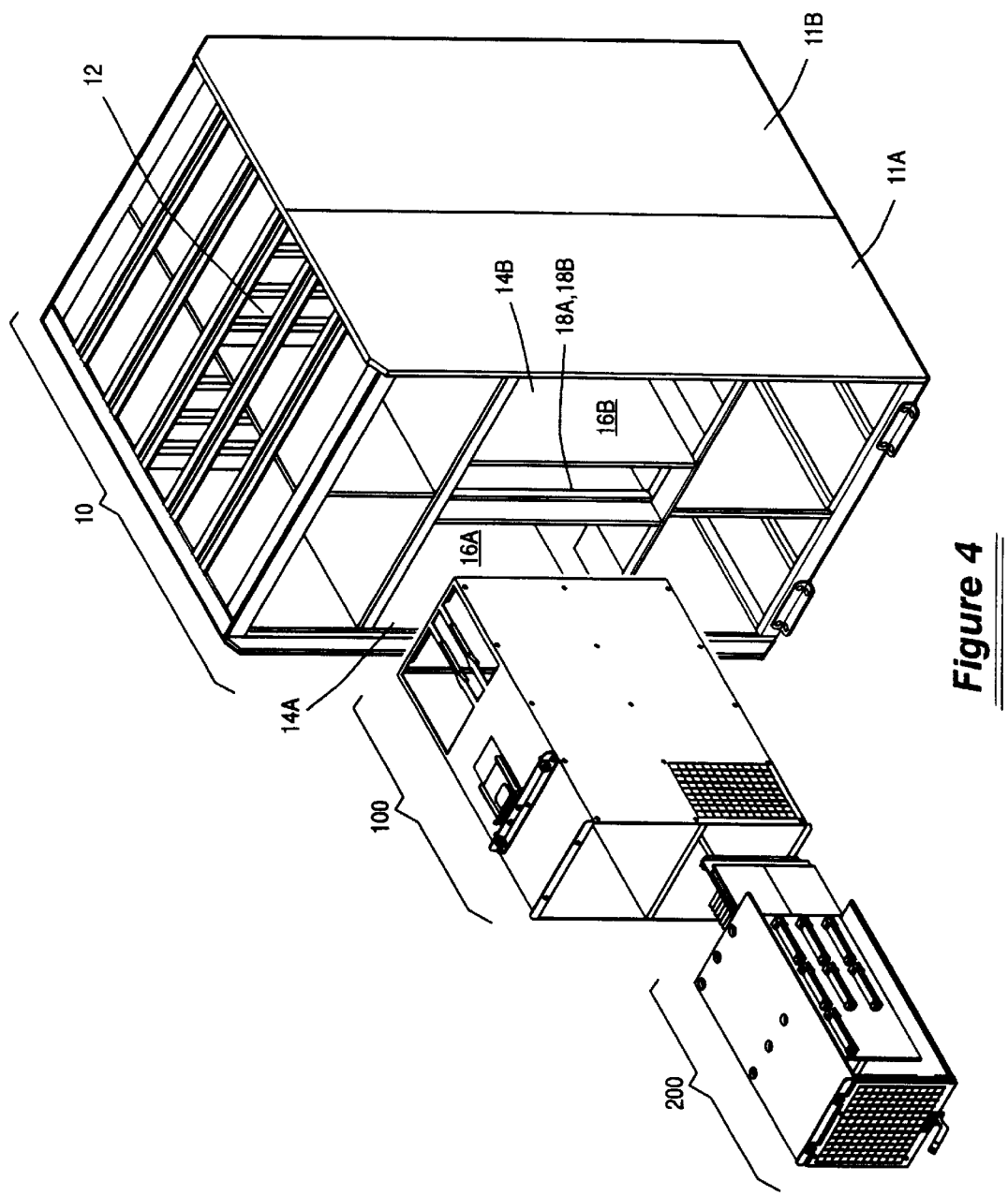
FIG. 4 is an exploded, perspective view of an embodiment of a packaging configuration for a computer system according to this invention.

Referring first to FIG. 4, a preferred embodiment of a packaging configuration according to this invention is illustrated in an exploded, perspective view. The outer panels, or "skin," of the packaging configuration has been removed in order to reveal internal features of the configuration. The preferred packaging configuration includes a computer system or server chassis having a skeleton formed from sheet metal, mechanical fasteners and other structural elements. Chassis 10 includes two modules 11A and 11B that are oriented in back-to-back arrangement with one another. It will be appreciated that modules 11A and 11B are identical and form mirror images of one another in the orientation shown. A main circuit board 12, often referred to as a "midplane," is provided in chassis 10 adjacent to the boundary between modules 11A and 11B. Further details of midplane 12 will be provided later with reference to FIG. 5.

Module 11A of chassis 10 defines two openings 14A and 14B in order to provide access to interior cavities 16A and 16B in module 11A. Although not visible in FIG. 4, two additional openings are provided on the back side of chassis 10 in module 11B. Accordingly, a total of four openings are provided at the corners in chassis 10. Between openings 14A and 14B of module 11A, and between the openings (not shown) in module 11B, additional openings are provided for access to the interior of chassis 10. Specifically, the additional openings in module 11A provide access to interior cavities 18A and 18B (see FIG. 5).

Openings 14A and 14B in module 11A are substantially rectangular in shape, and the interior cavities 16A and 16B adjacent to openings 14A and 14B are bounded by sheet metal surfaces on the sidewalls of the interior cavities. Interior cavities 16A and 16B extend to midplane 12.

The preferred packaging configuration also includes a processor assembly or pod 100. Further details of pod 100 will be provided later with reference to FIGS. 6A, 6B, 7A, 7B, 8A, and 8B. Also provided as a component of the packaging configuration is a processor subassembly or sub-pod 200. As illustrated in the exploded view provided in FIG. 4, the packaging configuration of this invention has a modular construction. In other words, sub-pod 200 is configured for insertion into and removal from pod 100, and pod 100 is in turn configured for insertion into and removal from chassis 10.

The cross-sectional shape of pod 100 (in a direction perpendicular to the axis of the cavity 16A or 16B into which it is to be inserted) is selected to correspond to the shape of opening 14A or 14B in module 11A of chassis 10. In other words, the chassis of pod 100 is sized and shaped so that it fits snugly within the selected chassis opening and the corresponding interior cavity. Such a fit ensures that pod 100 can only be inserted in the intended orientation and that pod 100 is properly aligned with components of midplane 12. Similarly, the cross-sectional shape of sub-pod 200 is selected to correspond to an opening in the chassis of pod 100 to ensure proper orientation and alignment of sub-pod 200 with respect to pod 100.

Because of the four openings (such as openings 14A and 14B) provided at the corners of chassis 10, the chassis can accommodate up to four pods such as pod 100. Each pod corresponds to the pod or processor assembly 2802 illustrated in FIG. 3. Also, because two openings are provided in pod 100, each pod can accommodate up to two sub-pods such as sub-pod 200. Each sub-pod corresponds to the sub-pods 2804A and 2804B illustrated in FIG. 3.

Figure 5:
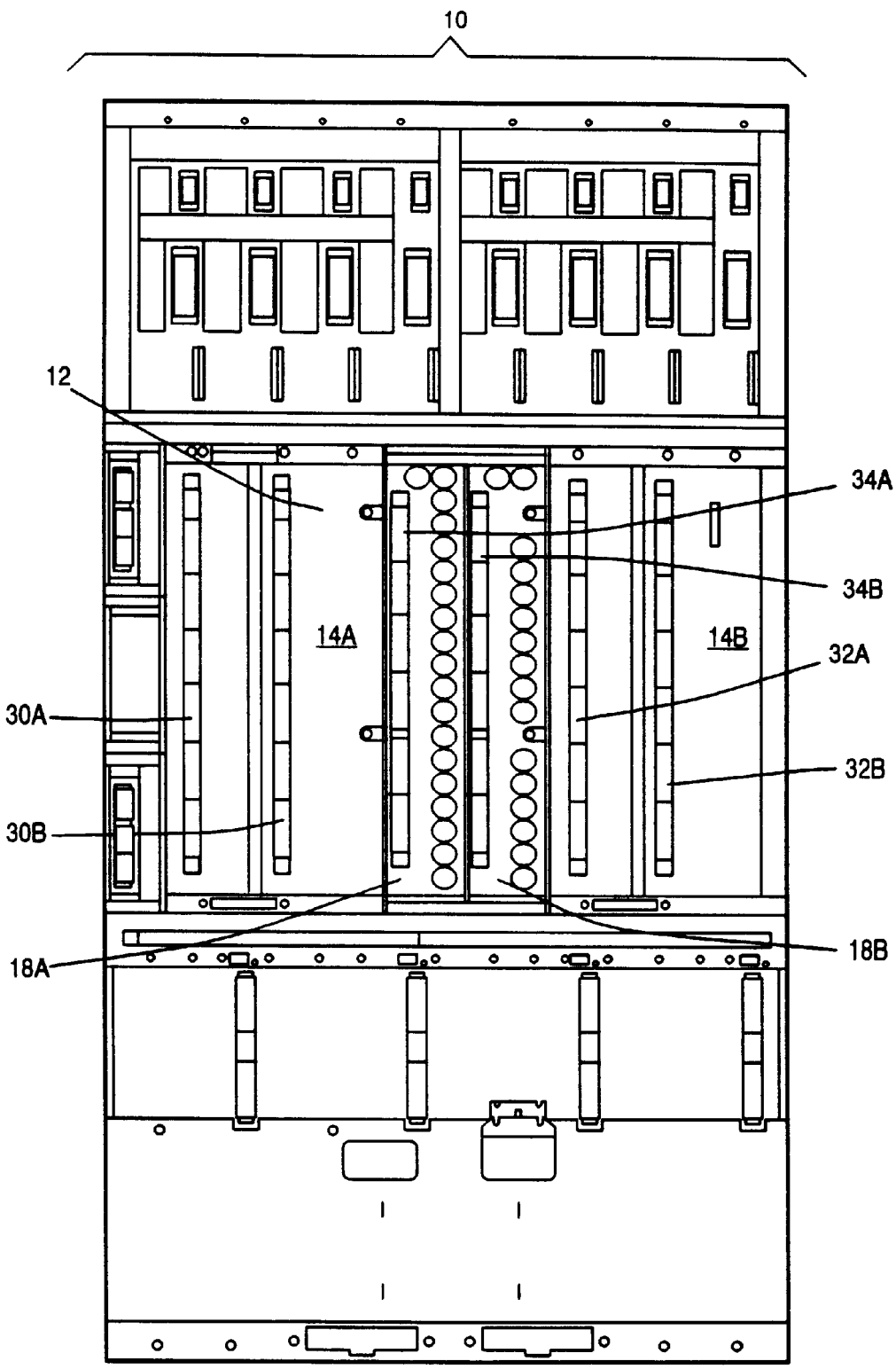
FIG. 5 is a front view of an embodiment of a chassis adapted for use in the packaging configuration illustrated in FIG. 4.

Referring now to FIG. 5, a front view of module 11A of chassis 10 is illustrated in order to reveal additional features of midplane 12, interior cavities 16A and 16B, and interior cavities 18A and 18B. Midplane 12 is provided with a series of interface connectors that are oriented in juxtaposition with the interior cavities of module 11A in a facing relationship with the openings that are provided for access to the respective interior cavities. More specifically, midplane 12 is provided with a pair of interface connectors 30A and 30B in juxtaposition with interior cavity 16A and facing toward opening 14A, a pair of connectors 32A and 32B in juxtaposition with interior cavity 16B and facing toward opening 14B, and a pair of interface connectors 34A and 34B in juxtaposition with interior cavities 18A and 18B, respectively. Connector pairs 30A/30B and 32A/32B are provided for connection to corresponding connectors provided on the back end of a corresponding pod such as pod 100 as will be described later with reference to FIG. 6B. Connector pairs 30A/30B and 32A/32B provide interface between the pods and the midplane 12 for the communication of signals and power therebetween.

Connectors 34A and 34B are provided for connection to memory modules or memory storage units (not shown) that are to be mounted within interior cavities 18A and 18B, respectively. Each of the memory modules corresponds to the memory storage units 220A'–220D' illustrated in FIG. 2. Because four cavities are provided in chassis 10 (cavities 18A and 18B in module 11A and two cavities (not shown) in module 11B), chassis 10 accommodates up to four memory modules such as memory modules 220A'–220D' illustrated in FIG. 2.

Figure 3:
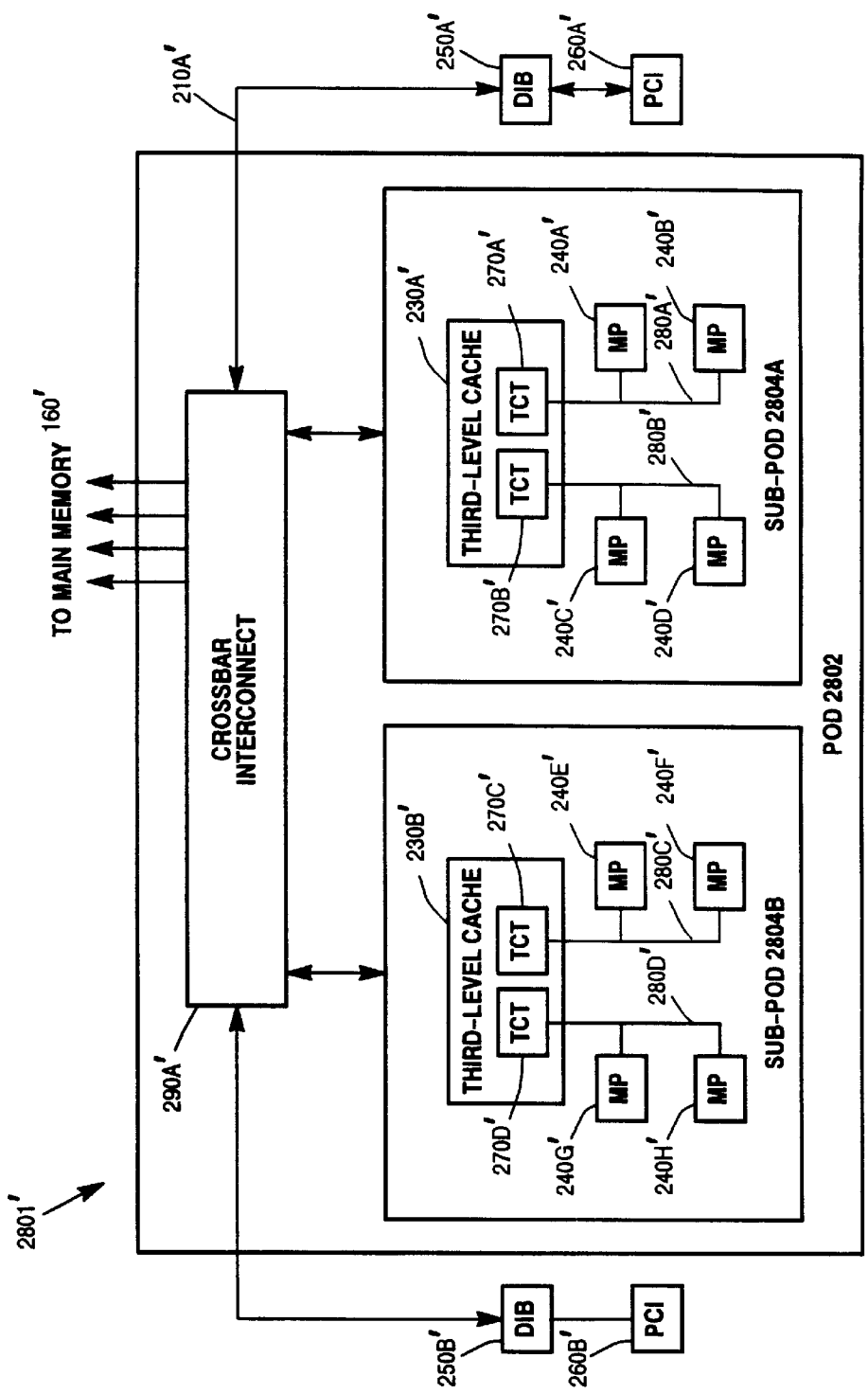
FIG. 3 is a block diagram illustrating features of the computer system illustrated in FIG. 2.

To provide the preferred computer system, chassis 10 is provided with four pods 100 (such as pods 2802 in FIG. 3), each of which is provided with two sub-pods 200 (such as sub-pods 2804A and 2804B in FIG. 3). Each of the pods is connected to the midplane 12 of chassis 10, and each of the sub-pods is connected to the mezzanine board of the respective pods. The memory modules (such as memory storage units 220A'–220D') are also connected to midplane 12. In this manner, the sub-pods are connected via the mezzanine boards of the pods and the midplane of the chassis to the memory. The modular construction of the packaging configuration permits removal and replacement of the sub-pods vis-a-vis the pods and permits removal and replacement of the pods vis-a-vis the chassis.

Figure 6B:
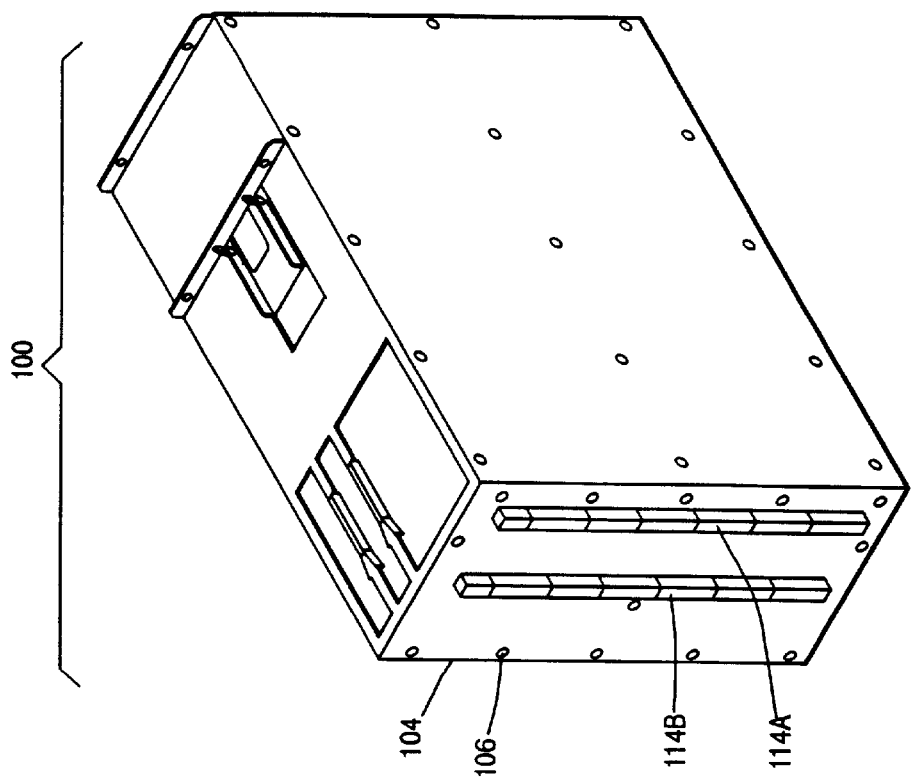
FIGS. 6A and 6B are perspective views of an embodiment of a pod assembly adapted for use in the packaging configuration illustrated in FIG. 4.
Figure 6A:
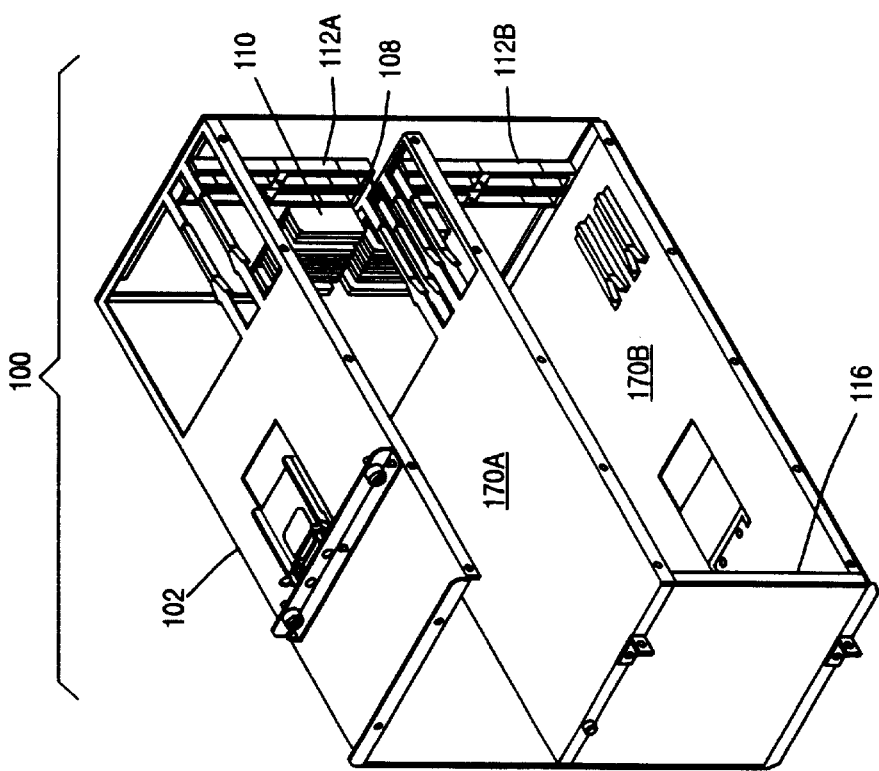

Referring now to FIGS. 6A and 6B, perspective views of aspects of a processor assembly or pod 100 according to this invention are provided. Generally, pod 100 includes a chassis assembly that is configured for releasable connection within a computer system and that is configured to receive one or two processor subassemblies or sub-pods 200. The chassis assembly includes a circuit board mounted at least partially within the interior of the chassis in juxtaposition with the openings of the chassis. The circuit board includes a connector positioned for connection to a computer system's circuit board as well as a connector positioned on another surface of the circuit board for connection to each sub-pod's circuit board. The pod chassis is configured for sliding insertion into an opening of a computer system's chassis for connection to the computer system's circuit board. The chassis is also configured to receive in the opening at least one processor subassembly or sub-pod for connection to the sub-pod's circuit board.

The provision of pod 100 has been discovered to confer significant benefits. For example, pod 100 can be replaced or removed for maintenance of the pod's circuit board as well as for the replacement of components (e.g., ASICs) mounted on the pod's circuit board. Also, pods 100 make the overall computer system "scalable" in that a system can be provided with fewer or more pods depending upon the requirements of the user. For example, the chassis 10 can be hold up to four pods 100 but only one pod need be purchased and used initially. Later, if desired, up to three additional pods 100 can be acquired and inserted into chassis 10.

As shown in FIG. 6A, a side panel of pod 100 has been removed in order to reveal internal features of this preferred embodiment. Pod 100 includes a processor assembly or pod chassis 102 to which a circuit board or mezzanine board 104 is mounted by means of screw/washer assemblies 106 and hex standoffs 108. Two application specific integrated circuits (ASICs) are mounted to mezzanine board 104, and a heat sink 110 is provided adjacent each ASIC in order to transfer and dissipate the heat generated by the respective ASICs. Referring back to the pod embodiment 2802 illustrated in FIG. 3, the ASICs 285A' and 285B' provide crossbar switch interconnect 290A', and heat sink 110 is provided to transfer heat from crossbar switch 290A'.

Circuit board assembly 104 also includes two sets of interface connectors 112A and 112B facing toward interior regions of pod 100 as well as interface connectors 114A and 114B, preferably female connectors, facing outwardly from the back end of pod 100. Interface connectors 114A and 114B are positioned for connection to interface connectors 30A and 30B, respectively, or interface connectors 32A and 32B, respectively, of chassis 10 (FIG. 5). The orientation and alignment of pod 100 and connectors 114A and 114B with the mating connectors (connectors 30A and 30B, for example) in chassis 10 is important to ensure proper connection and to reduce the risk of damage to the connector components that can be caused by misalignment. Accordingly, it is advantageous for the shape of pod chassis 102 to correspond closely with the shape of the corresponding opening (such as opening 14A) in chassis 10.

As illustrated in FIG. 6A, pod chassis 102 defines two interior regions—an upper interior region 170A and a lower interior region 170B. The set of interface connectors 112A are oriented to face toward an opening 168A (FIG. 7A), which provides access to interior region 170A of pod chassis 102. Interface connectors 112B are oriented to face toward opening 168B (FIG. 7A), which provides access to interior region 170B.

As illustrated in FIG. 6A, a filler or cover plate assembly 116 is provided to prevent access into the lower interior region 170B of pod 100 when only one sub-pod is installed (e.g., in the upper interior region 170A). Filler plate 116 also is useful to maintain a desired air flow pattern through the system so that the air flow pattern is substantially the same whether the pod is provided with (1) two sub-pods (one in each interior region 170A and 170B), or (2) a sub-pod in one interior region and a filler at the opening adjacent to the empty interior region. Filler 116 also provides an EMI barrier to reduce electro-magnetic interference.

Figure 7B:
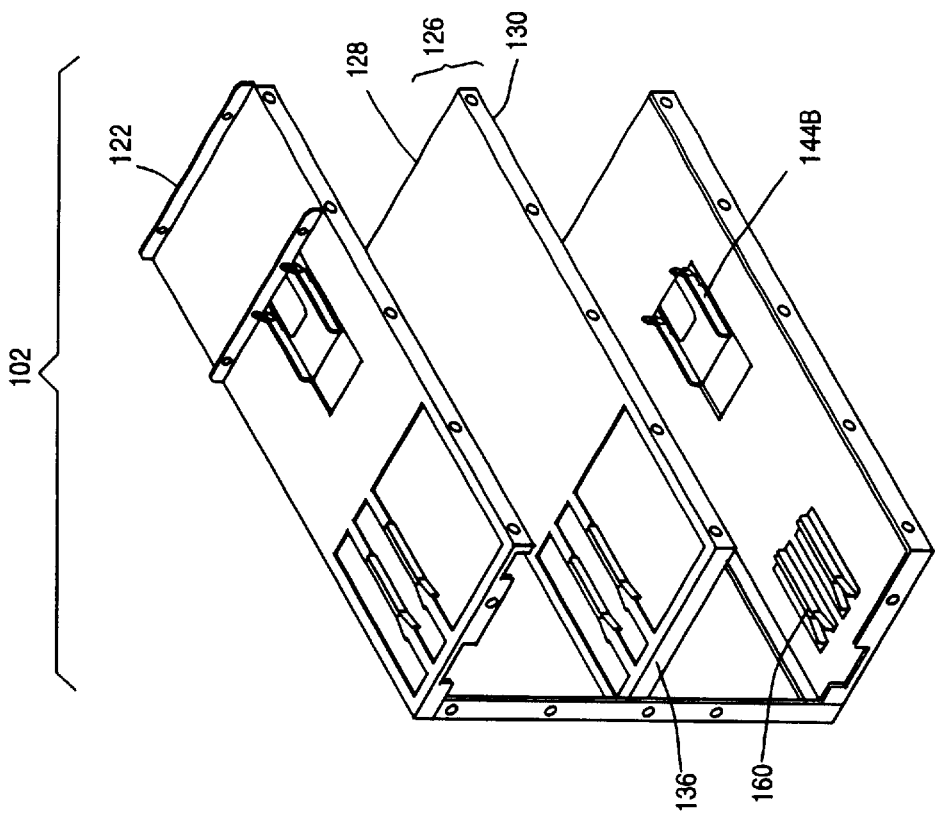
FIGS. 7A and 7B are perspective views of an embodiment of a chassis adapted for use in the pod assembly illustrated in FIGS. 6A and 6B.
Figure 7A:
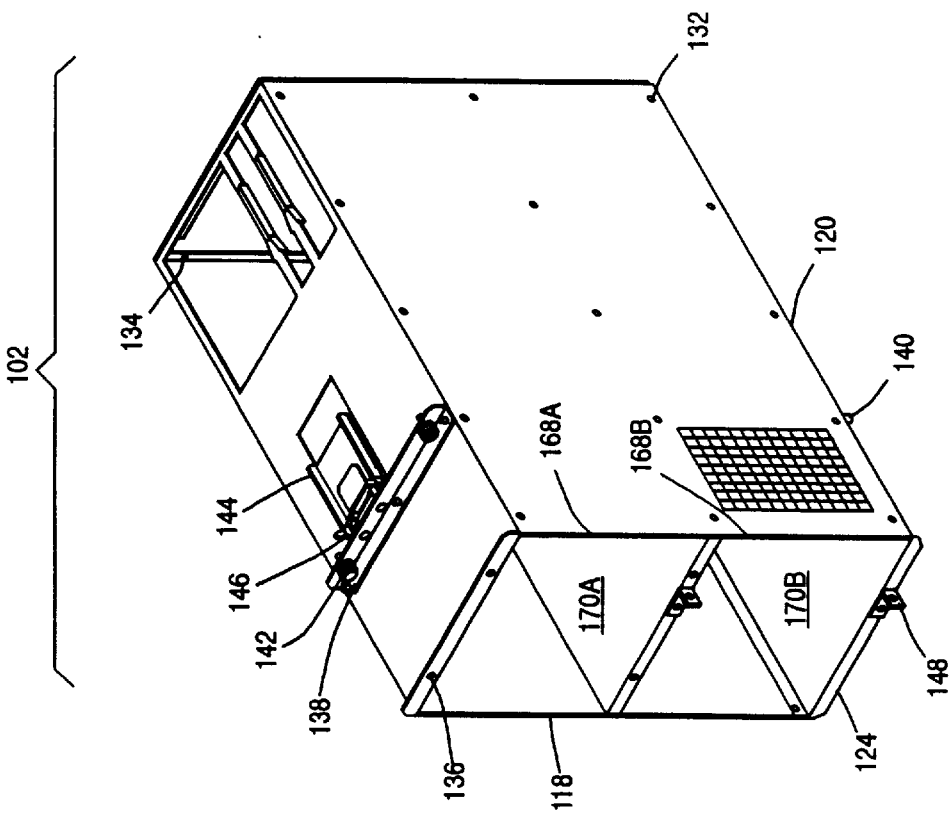

Referring to FIGS. 7A and 7B, processor assembly chassis 102 includes a left side panel 118 and a right side panel 120. Extending across the space between side panels 118 and 120 is a pod top plate 122, a pod bottom plate 124, and a mid-support 126. The panels 118 and 120, the plates 122 and 124, and mid-support 126 together cooperate to define interior regions 170A and 170B. The panels, plates and supports are preferably formed from sheet metal. Mid-support 126 is formed from an upper mid-support plate 128 connected to a lower mid-support plate 130. Rivets 132 are used to hold the components of the pod chassis 102 together and plain clinch nuts 134 and self-locking clinch nuts 136 are provided on pod chassis 102 so that other components can be attached to the chassis.

Processor assembly chassis 102 is also provided with a lever stop bracket 148 mounted to pod bottom plate 124 and to mid-support 126. Lever stop brackets 148 permit engagement between sub-pod 200 and processor assembly chassis 102. Brackets 148 are formed from sheet metal bent to provide a bearing surface against which a mating component of sub-pod 200 can be positioned to provide the pod/sub-pod engagement. Further details of this aspect of the invention will be provided later with reference to FIGS. 13–16.

On pod top plate 122 is provided a top mounting angle 138, and a bottom mounting angle 140 is provided on pod bottom plate 124. A pair of panel fastener screw assemblies 142 is provided on top mounting angle 138 and on bottom mounting angle 140 to provide for mechanical connection between top mounting angle 138 and bottom mounting angle 140 and mating surfaces of chassis 10. As shown in FIG. 5, for example, mating flanges with threaded holes are provided above and below opening 14A of chassis 10 for threaded engagement with fastener screw assemblies 142 and top and bottom mounting angles 138 and 140. Also mounted to top plate 122 is a dual locking lever 144A, which is connected to top mounting angle 138 by means of a lever pivot block 146. As shown in FIG. 7B, a corresponding dual locking lever 144B is connected to bottom plate 124 in the same way.

Figure 8A:
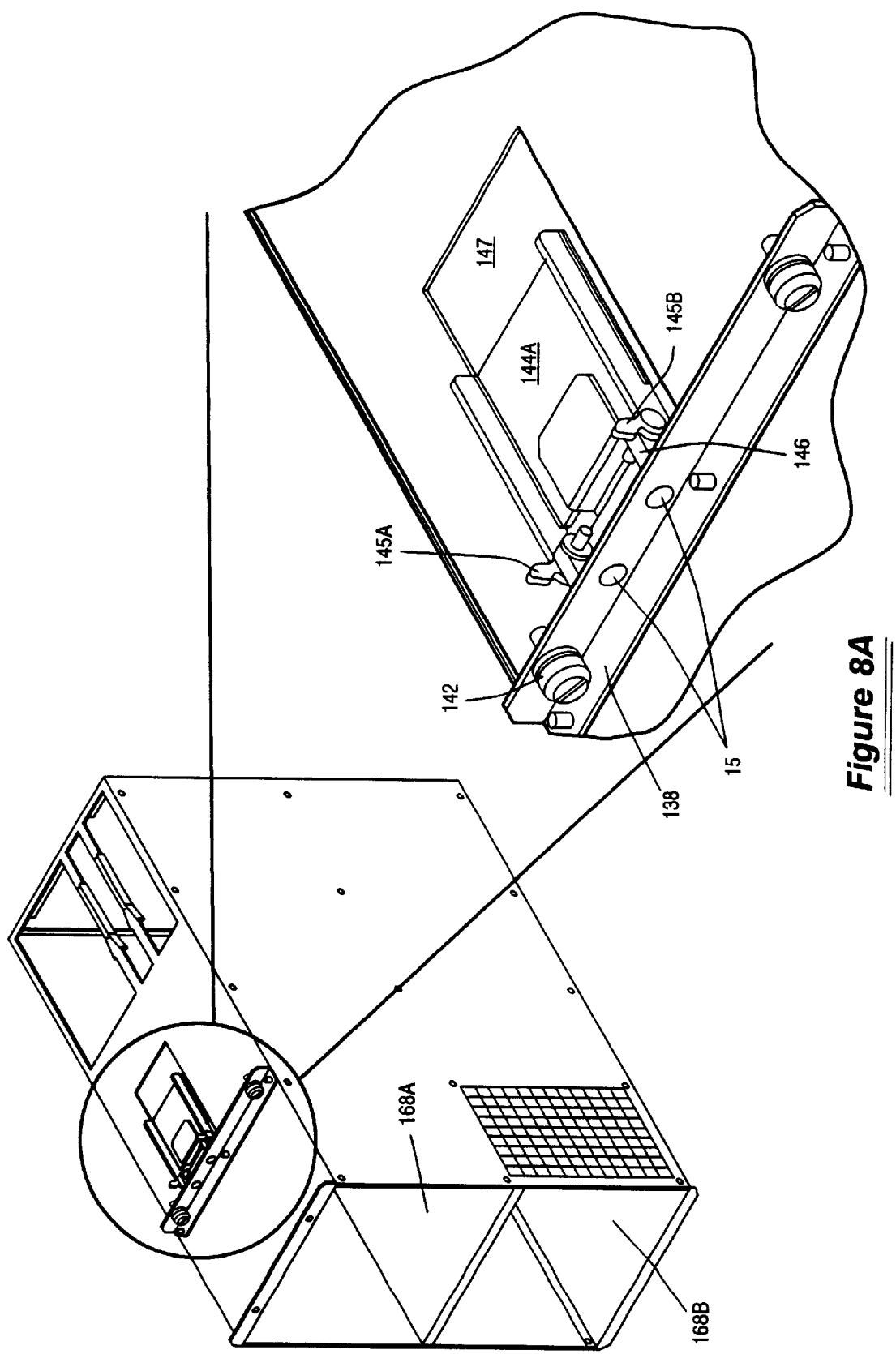
FIGS. 8A and 8B are perspective views illustrating details of the chassis illustrated in FIGS. 7A and 7B.

Referring to the detail provided in FIG. 8A, which illustrates preferred features of dual locking lever 144A, the lever 144A is provided with spaced apart engagement members 145A and 145B positioned to engage surfaces of chassis 10 such as a sheet metal flange or other support member when dual locking lever 144A is in the engaged position (as shown in FIG. 8A). Locking lever 144A is connected to top mounting angle 138 by means of a lever pivot block 146 which is connected by two blind rivets 15. Panel fastener screw assemblies 142 are provided for connection of mounting angle 138 to a flanged surface of chassis 10. Lever 144A is mounted to top and bottom plates at a location corresponding to an opening such as rectangular opening 147 in top plate 122.

Levers 144A and 144B provided on the top and bottom panels 122, 124 of the pod chassis 102 are especially beneficial because of the force that can be required to bring about mating connection between the pod 100 and the chassis 10. More specifically, an insertion force is required to bring about mating connection between the connectors 114A and 114B on the rear surface of mezzanine board 104 of the pod 100 and the connectors (e.g., connectors 30A and 30B) on the facing surface of midplane 12 of chassis 10. In order to assist with the generation of this insertion force, the engagement members 145A and 145B of lever 144A provide a cam-like action against a surface of chassis 10 as the lever is rotated from the open position (with lever 144A extending downwardly from panel 122 into interior 170A) to the closed position (shown in FIG. 8A). As lever 144A is rotated with respect to mounting block 146, contact between the engagement members 145A and 145B and the mating surface of chassis 10 urges pod 100 inwardly toward midplane 12 of chassis 10.

The connectors 114A and 114B of the pod 100 and the mating connectors (e.g., connectors 30A and 30B) of the chassis midplane 12 can have a large number of pins and mating sockets—perhaps as many as 2400 pins or more may be required for adequate communication between the pod 100 and midplane 12. Such interface connectors, especially with a large number of pin/socket connections, require a significant insertion force which can approach or even exceed 150 pounds of force. The use of one or more levers 144A and 144B on panels of pod 100 helps to generate this force and reduces the pushing force that must be applied by the user of the system.

Lever 144A shown in FIG. 8A is mounted for rotation with respect to pod 100 by means of a fastener assembly that will be described in detail later with reference to FIGS. 13–16. The lever 144A and the opening 147 at which lever 144A is mounted is slightly offset from the center of top panel 122 in the embodiment illustrated in FIG. 8A. This orientation can be provided to accommodate other structural components of pod 100 as well as the orientation of a mating surface in chassis 10.

Still referring to FIG. 8A, it will be appreciated that levers 144A and 144B are accessed through openings 168A and 168B and interior regions 170A and 170B (FIG. 7A) in order to engage or disengage lever 144A for insertion or removal of pod 100 with respect to chassis 10. Such access to the interior regions 170A and 170B of pod 100 to grasp and rotate lever 144A and 144B inwardly into the interior regions is blocked when the sub-pods 200 are mounted within interior regions 170A and 107B. Accordingly, pod 100 must be empty of sub-pods 200 before levers 144A and 144B can be accessed to insert and engage pod 100 within chassis 10. Similarly, the sub-pods 200 must be removed from pod 100 before levers 144A and 144B can be accessed to disengage pod 100 from chassis 10. This orientation of levers 144A and 144B therefore prevents the removal of a pod 100 from chassis 10 before sub-pods 200 are removed from the pod 100.

Figure 8B:
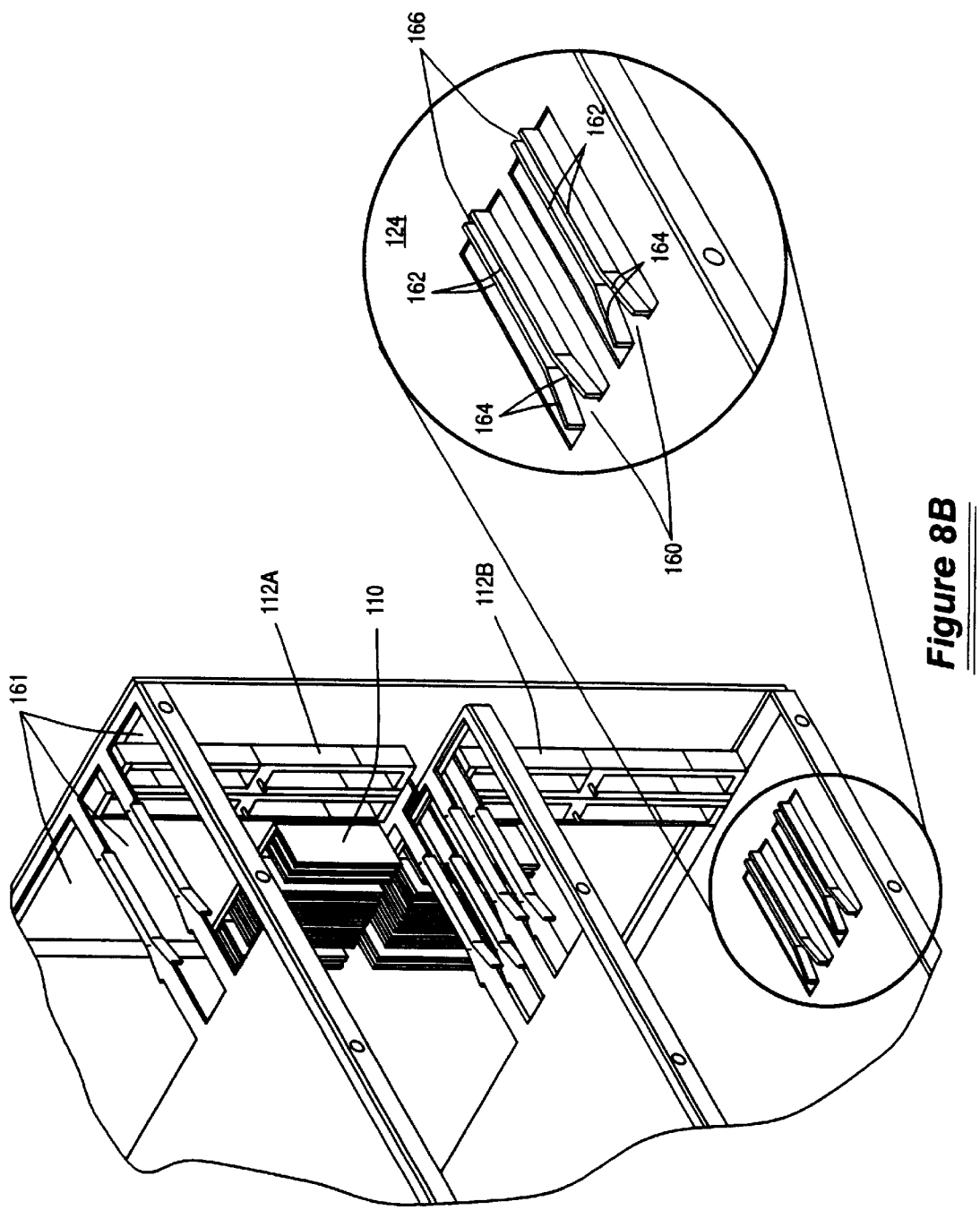

As described above, panels 118 and 120 and plates 122, 128, 130, and 124 together define two openings 168A and 168B and two interior regions 170A and 170B separated by mid-support 126. Pod circuit board 104 is provided with a pair of connector strips for each interior region of pod assembly chassis 102. Plates 122, 128, 130, and 124 are each provided with a pair of guides 160 surrounded by airflow openings 161 (FIG. 8B). Card guides 160 are provided to receive and align circuit boards of sub-pod 200. It has been discovered that the weight and length of some circuit board assemblies can make it difficult to align end connectors with a mating board. This is especially true during "blind" insertion when the interface of mating connectors cannot be visualized by the user of the system as the card is being inserted. Also, it has been discovered that circuit board warpage can occur. Accordingly, circuit board guides or card guides 160 are very helpful for ensuring proper alignment and insertion.

Referring to the detail provided in FIG. 8B, which illustrates a portion of bottom plate 124, each of the card guides 160 is formed from a pair of detents which provide longitudinally extending flanges 162 and angled flanges 164 separated by gaps. The flanges 162 and 164 together define channels 166 in the sheet metal bottom plate 124. These card guides are provided to align circuit boards (not shown here) of sub-pod 200 with connectors 112A and 112B, as will be described in detail later. The angled flanges 164 converge as they approach the elongated flanges 162, thereby providing a region for receiving an edge of a circuit board as it is being inserted. The receiving regions of card guides 160 face toward openings 168A and 168B through which the sub-pods 200 and their respective circuit boards are inserted.

Referring now to FIGS. 9A–9C, 10A–10F, 11A–11C, and 12, features of a processor subassembly or sub-pod 200 according to this invention will now be described. Generally, the processor subassembly or sub-pod is provided with a chassis at least partially defining an interior and an opening for access to the interior. The chassis includes a support that extends between wall portions of the chassis. The processor subassembly also includes a circuit board mounted to the chassis and positioned at least partially within the interior of the chassis. A processor is provided within the interior of the chassis, and the processor is releasably connected to the circuit board, wherein the processor is positioned adjacent to the support and has an edge portion in contact with the support. The chassis of the processor subassembly is configured for insertion of the processor into the interior through the opening for releasable connection to the circuit board. The chassis of the processor subassembly is also configured for insertion into and removal from a computer system's or pod's chassis to facilitate releasable interconnection between the circuit board of the processor subassembly and a circuit board of the computer system or pod.

Figure 9B:
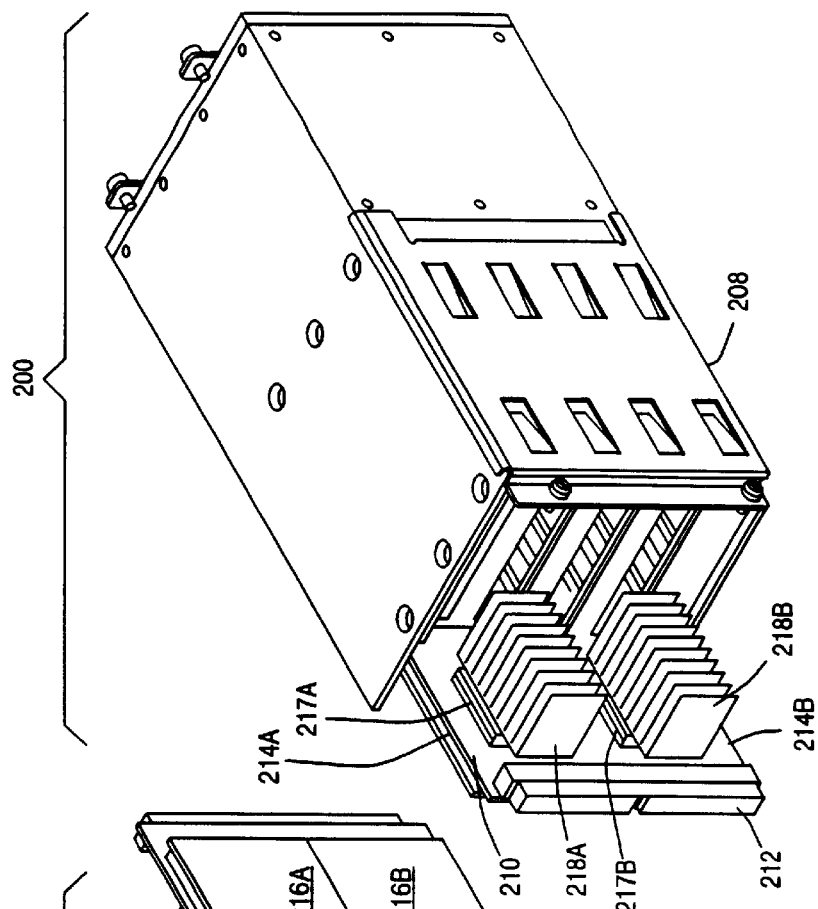
FIGS. 9A and 9B are perspective views of an embodiment of a processor subassembly adapted for use in the packaging configuration illustrated in FIG. 4.
Figure 9A:
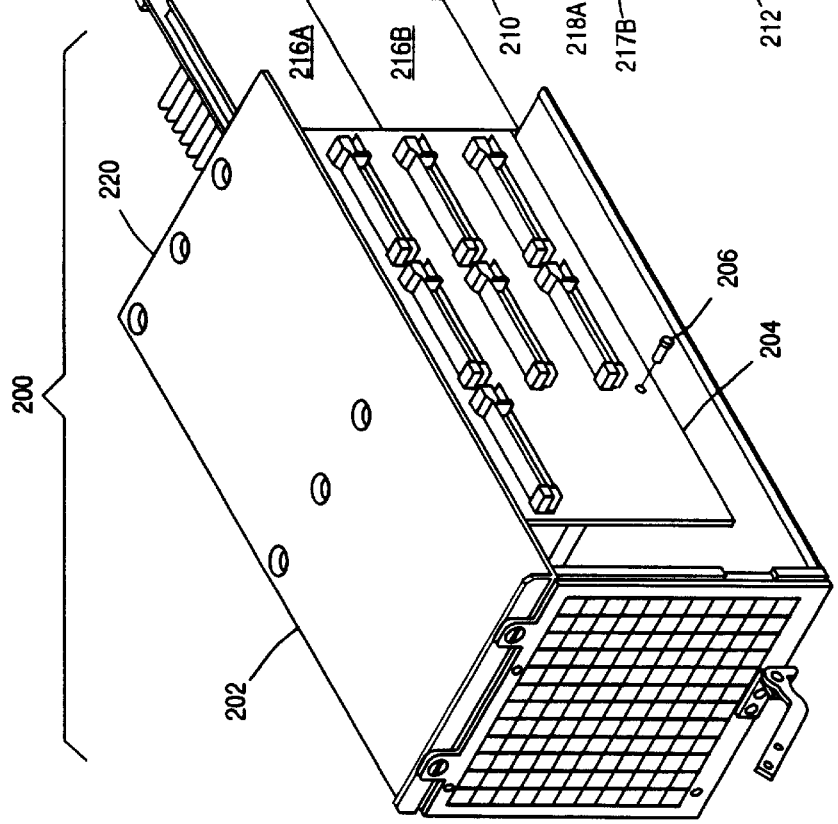

Referring first to the perspective views of sub-pod 200 provided in FIGS. 9A and 9B, sub-pod 200 includes a subassembly chassis 202 and a circuit board 204 mounted at least partially within the subassembly chassis 202. Screws 206 or other fasteners are used to mount the circuit board 204 within subassembly chassis 202. Sub-pod 200 includes a cover 208, details of which will be provided later with reference to FIGS. 11A–11C. Cover 208 restricts access to an interior region of subassembly chassis 202 through an opening.

The end edge of an end portion 210 of circuit board 204 is provided with an interface connector 212. The side edges of end portion 210 are provided with edge portions 214A and 214B. Connector 212 is adapted and configured for interconnection with the connector sets 112A or 112B of pod 100 (illustrated in FIG. 8B). Connector sets 112A and 112B each include two elongated connectors positioned side-by-side, but the circuit board 204 of sub-pod 200 only includes a single, elongated connector 212. The reason for this is that pod 100 is designed to accommodate various sub-pod configurations that have different circuit board positions (e.g., depending on the size of the processor to be installed in the sub-pod) and, therefore, different positions for connector 212. When sub-pod 200 is inserted in pod 100, connector 212 will mate with one of the connectors in connector sets 112A or 112B, and the other connector in the set will not be mated. The card guides 160 of pod 100 are also provided in sets so as to accommodate various sub-pod configurations. Each of the card guides 160 is aligned with one of the connectors of connector set 112A or 112B. These features provide the pod/sub-pod system with added versatility in that a particular, universal pod 100 can accommodate various sub-pod configurations.

In order to facilitate the interconnection between connector 212 of sub-pod 200 and connector sets 112A or 112B of pod 100, edge portions 214A and 214B of circuit board 204 are slidingly engaged within card guides 160 of pod 100. As described above, although only one circuit board 204 is provided in each processor subassembly or sub-pod 200, multiple card guides 160 are provided in pod 100 in order to accommodate different circuit board positions depending upon the size of the processors contained within processor subassembly or sub-pod 200, as will be described later. The angled flanges 164 of card guides 160 aid with the alignment of the circuit board 204 with the channels 166 defined by the longitudinally extending flanges 162 of the card guides 160.

Also provided on circuit board 204 are cache memory units 216A and 216B, third level cache controller units 217A and 217B, and a pair of heat sinks 218A and 218B positioned adjacent to the cache controller units 217A and 217B for the dissipation of heat. As illustrated in FIGS. 9A and 9B, end portion 210 of circuit board 204 extends beyond an edge portion 220 of subassembly chassis 202. This configuration has been discovered to permit additional air flow for heat dissipation from heat sinks 218A and 218B. This configuration also makes it possible to utilize side edge portions 214A and 214B of circuit board 204 in conjunction with card guides 160 of pod 100 in order to facilitate proper orientation of the connector 212 of sub-pod 200 with the connector 112A or 112B of pod 100.

Figure 9C:
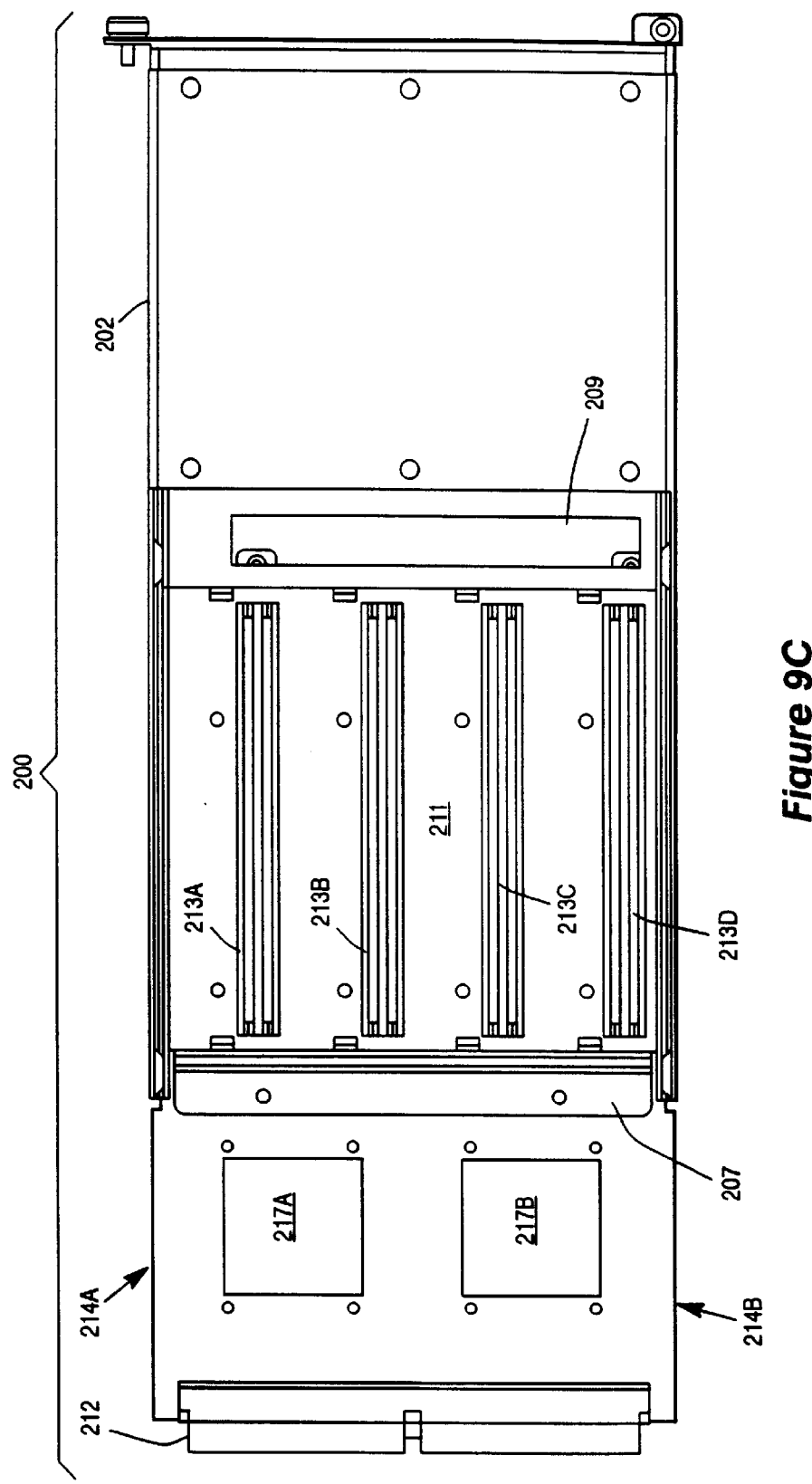
FIG. 9C is a left side view of the processor subassembly illustrated in FIGS. 9A and 9B.

Referring now to FIG. 9C, cover assembly 208 of sub-pod 200 has been removed in order to reveal internal features of this preferred embodiment. Heat sinks 218A and 218B have also been removed to reveal the position of cache controller units 217A and 217B. Mounted on circuit board 204 are four interface connectors 213A–213D. Each of these connectors, 213A–213D, are provided for interconnection with a processor cartridge assembly, as will be described later with reference to FIG. 12. These connectors are visible through an opening 211 defined in a wall portion of subassembly chassis 202, which opening is provided for access to the interior of subassembly chassis 202 for insertion and removal of processors. Adjacent to opening 211 is a slotted opening 209 which is positioned for engagement of an edge portion of cover 208 in a manner that will be described later. On an opposite side of opening 211 from slotted opening 209 is provided a flange 207 for the engagement of cover assembly 208, as will be described.

Figure 10C:
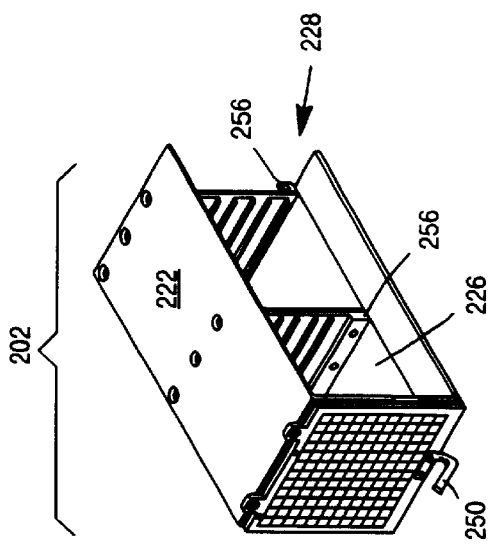
FIGS. 10A, 10B, 10C, 10D, 10E, and 10F are views of an embodiment of a chassis adapted for use in the processor subassembly illustrated in FIGS. 9A, 9B, and 9C.

Referring now to FIGS. 10A–10F, preferred features of sub-pod chassis 202 will now be described. Sub-pod chassis 202 includes a sub-pod top plate 222, a subassembly side plate 224, and a subassembly bottom plate 226, each of which are formed from sheet metal bent into the configuration shown. Subassembly top plate 222 and subassembly bottom plate 226 extend substantially along the length of sub-pod chassis 202 from one end to the other. Subassembly side plate 224 terminates at one end of sub-pod chassis 202 and terminates adjacent to slotted opening 209, thereby defining the opening 211 which provides access to the interior of sub-pod chassis 202. Because the wall portions of sub-pod chassis 202 extend only around three of the four sides of the sub-pod chassis, an open side 228 is formed as is illustrated in FIG. 10C, for example.

Figure 10F:
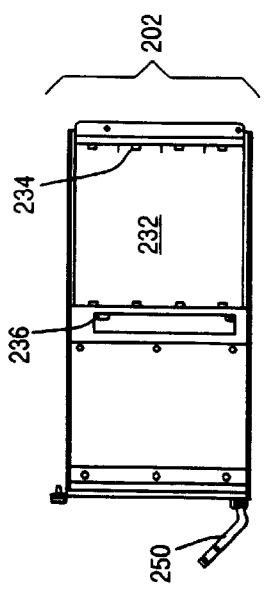
Figure 10B:
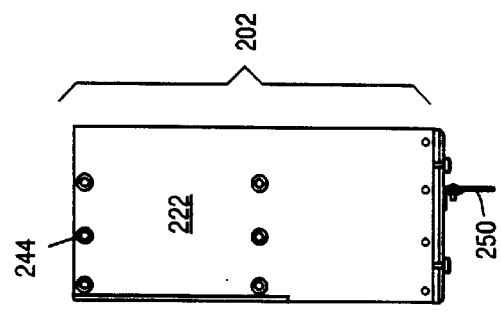

As illustrated in FIG. 10F, an interior region 232 is defined by subassembly top plate 222, subassembly side plate 224, and subassembly bottom plate 226. An end support 234 extends between subassembly top plate 222 and subassembly bottom plate 226 and is attached to each of the plates 222 and 226 by means of pop rivets 244. A mid support 236 is provided in a location spaced from that of end support 234, thereby defining a space for the insertion of processors. Flanges 238 (FIG. 10D) are provided on the end support 234 and mid-support 236 in order to form brackets for engaging processors. Specifically, three flanges 238 are formed on each support 234 and 236 in order to define four channels. Each channel is shaped and positioned to receive an edge portion of a processor. Accordingly, sub-pod 200 is adapted to hold four processors which are slid edgewise into opening 211 in parallel arrangement with respect to one another. The direction of insertion of the processors into opening 211 and the orientation of the interconnection between the processors and the circuit board 204 are substantially perpendicular to an axis running along the length of sub-pod 200. A series of detents 240 (FIG. 10D) are provided between adjacent flanges 238 on each support 234, 236 for engagement between sub-pod chassis 202 and the edge of each processor cartridge as will be discussed later with reference to FIG. 12.

Openings 242 are provided to extend through supports 234 and 236. Openings 242 facilitate the flow of air through the interior of sub-pod 200 adjacent to the processors. Rivets 244 are used to mount supports 234 and 236 rigidly within sub-pod chassis 202.

Figure 10E:
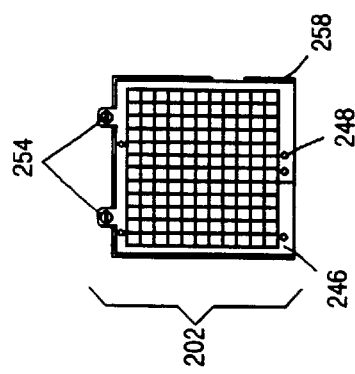
Figure 10A:
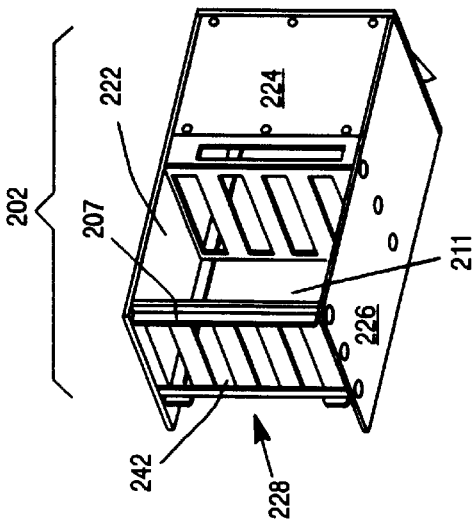

As shown in FIG. 10E, sub-pod chassis 202 also includes a sub-pod front plate assembly 246 having a lever angle 248 and a long lever 250 (FIG. 10F). Long lever 250 is mounted for manual rotation with respect to sub-pod chassis 202 in order to engage a lever stop bracket 148 (FIG. 7A) on the front surface of pod 100 in order to maintain the sub-pod 200 engaged within pod 100. Further features of lever 250 will be provided later with reference to FIG. 13. A fastener panel screw assembly 252 is provided at each of two tabs 254 that extend upwardly from sub-pod front plate assembly 246. Fastener panel screw assemblies 252 are used to mount sub-pod front plate 246 to pod 100 upon insertion of sub-pod 200 into pod 100. Tabs 256 are also provided on edge portions of supports 234 and 236 for the attachment of the sub-pod's circuit board 204 to the supports 234 and 236. Also provided on sub-pod chassis 202 is an EMI/RFI gasket, preferably formed from fabric and foam, in order to reduce electro-magnetic and radio-frequency interference.

Referring now to FIGS. 11A–11C, details of a preferred sub-pod cover assembly 208 according to one aspect of this invention will now be described. Panel fastener screw assemblies 260 are used to attach a flange portion 262 provided at an edge portion of cover assembly 208 to the sub-pod chassis 202. More specifically, panel fastener screw assemblies 260 are used to mount flange portion 262 of cover assembly 208 to a corresponding flange portion 207 (FIG. 9C) of sub-pod chassis 202. At the opposite edge portion of the cover assembly 208, a flange portion 266 defined at its upper and lower ends by recesses 267 is used for engagement in opening 209 of sub-pod chassis 202. In other words, flange portion 266 is configured to be inserted into opening 209 of chassis 202 (FIG. 9C) with flange portion 266 extending into the interior of the chassis and the remainder of that edge portion remaining adjacent to an outer surface of the chassis (see FIG. 9B). The bend in flange portion 266 facilitates the positioning of flange portion 266 through slotted opening 209. The fastener panel screw assemblies 252 can then be tightened to engage flange portion 262 against flange 207 of the sub-pod chassis 202 in order to attach cover assembly 208.

Sub-pod cover assembly 208 includes a sub-pod cover body 270 formed from sheet metal 272 that is provided with bends to form edge flanges 274 at the upper and lower edge portions of body 270 (only one is visible in FIG. 11C). Edge flanges 274 are positioned to engage the sub-pod at locations adjacent to the sub-pod top plate 222 and the sub-pod bottom plate 226 in order to help secure and align sub-pod cover 270 in a optimum position over opening 211. When attached, sub-pod cover assembly 208 restricts or prevents access to the interior of sub-pod chassis 202 through opening 211 (although access to the back of circuit board 204 is possible through open side 228 (FIG. 10A)).

According to another aspect of this invention, the sub-pod cover also includes spring elements in the form of an integral spring portion positioned for contact with the processors. The integral spring portion is configured to apply a compressive force against the processor installed within the sub-pod, thereby urging the processor toward the sub-pod's circuit board to maintain the connection between the processor and the sub-pod's circuit board. Referring still to the cover assembly embodiment selected for illustration in FIGS. 11A–11C, spring portions 276 are formed in the sheet metal 272 of cover 270. The spring portions are shaped and oriented to urge processors mounted within sub-pod chassis 202 into continuous engagement with their respective connectors 213A–213D (FIG. 9C) on circuit board 204. Spring portions 276 are integrally formed in the surface of sub-pod cover 270 by the formation of cut-outs around three sides of a rectangular sheet metal portion and the formation of a slight bend 280 along the remaining side of the rectangle in order to orient the spring portion 276 at an acute angle extending toward the interior of sub-pod assembly 200.

The quantity and locations of spring portions 276 are selected to correspond to the quantity and positioning of the processors that are to be installed as a part of sub-pod 200. In the embodiment selected for illustration in FIGS. 9A–9C, the sub-pod chassis 202 is adapted to accommodate four processors mounted in a substantially parallel arrangement in spaced, parallel planes. Accordingly, the cover assembly embodiment illustrated in FIGS. 11A–11C is provided with eight spring portions 276, two spring portions 276 being positioned to contact a side edge portion of each of the four processors.

The spring portions 276 and cover 270 are preferable formed from a corrosion resistant material having some memory after deflection so that spring portions 276 will exert a force against the edge surfaces of the processors. For example, type 302 cold rolled stainless steel can be used. The spring portions 276, or "spring fingers," apply pressure to the processors so that they can withstand shock and vibration while maintaining electrical contact with connectors 213A–213D. In other words, after the processors are fully inserted into sub-pod chassis 202, the cover assembly 208 is placed over them and attached to the chassis 202. When the cover assembly 208 is being attached, the spring portions 276 will compress, thereby creating a compressive load on the processors. This compressive load will keep the processor from moving when they undergo shock and vibration.

Figure 12:
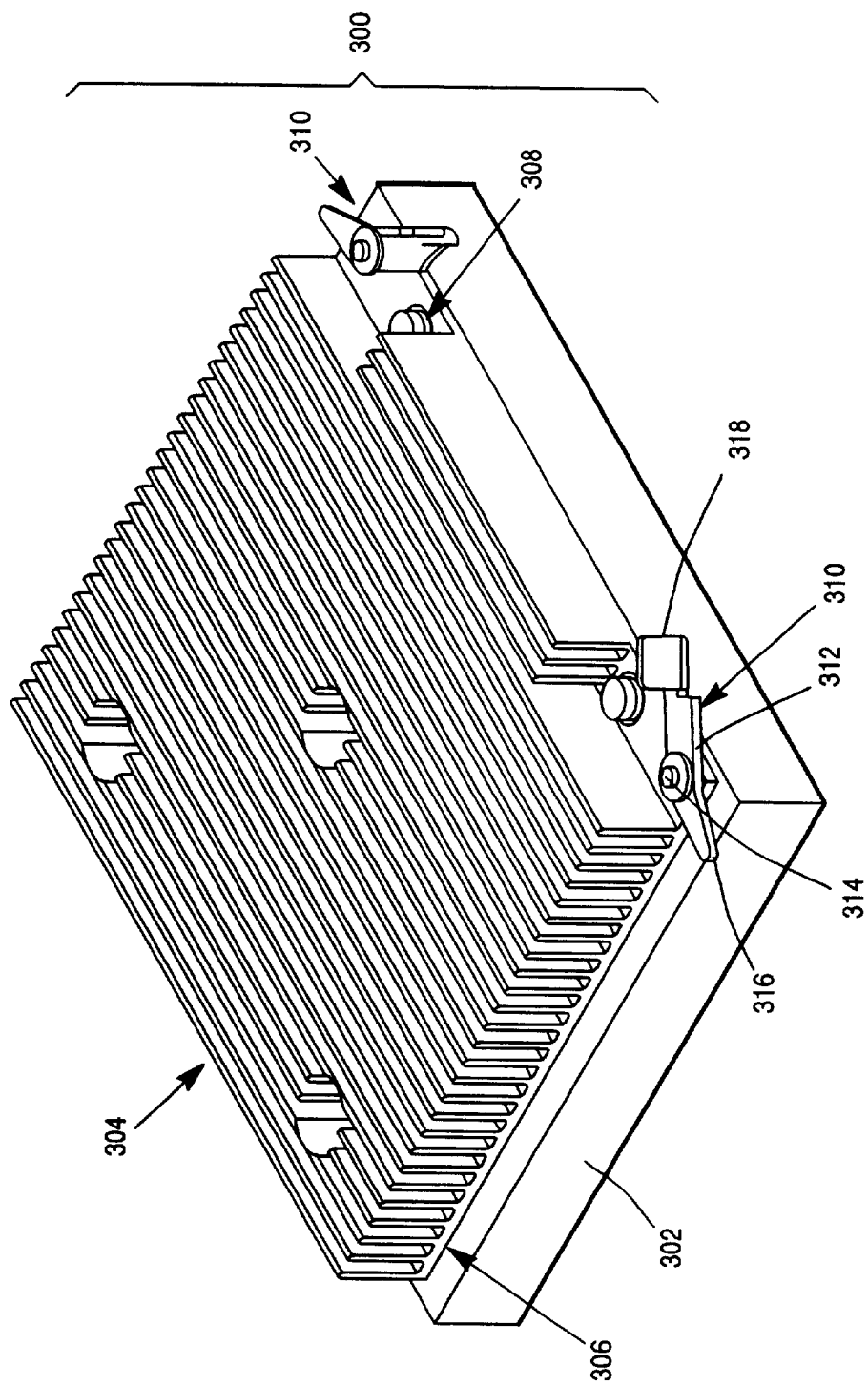
FIG. 12 is a perspective view of an embodiment of a processor cartridge assembly adapted for use in the processor subassembly illustrated in FIGS. 9A, 9B, and 9C.

Referring now to FIG. 12, a processor cartridge 300 adapted for use in the packaging configuration of this invention is illustrated. Processor cartridge assembly or processor cartridge 300 includes an integrated circuit 302 mounted adjacent to a heat sink assembly 304. A thermal interface 306 is provided between the upper surface of integrated circuit 302 and the bottom surface of heat sink assembly 304 in order to promote the transfer of heat by conduction from integrated circuit 302 to heat sink assembly 304 for dissipation of the transferred heat through the heat sink fins by means of air flow convection. Although a wide variety of thermal interfaces 306 can be used, exemplary thermal interface materials are available from Thermagon, Inc.

Figure 10D:
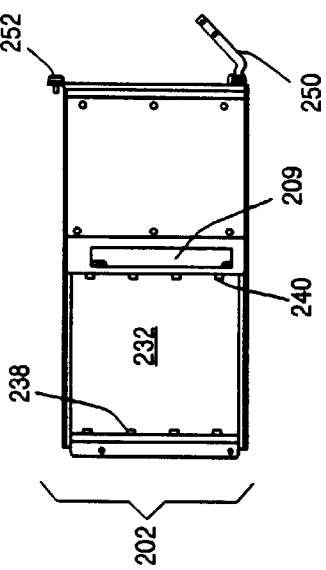

Connection between integrated circuit 302 and heat sink assembly 304 is provided by a series of assembled washer screws 308. Five screws 308 are used in the embodiment illustrated in FIG. 12. The side edge portions of processor cartridge assembly 300 are slidingly inserted between adjacent flanges 238 on the supports 234 and 236 of sub-pod chassis 202 (FIG. 10D). Two latch assemblies 310 are provided on processor cartridge assembly 300 to hold it in place. Each latch assembly 310 includes a pivotable latch 312, a pivot 314, and an engagement end portion 316 and contact surface 318 at opposite ends of latch 312. Upon insertion of the processor cartridge 300 into sub-pod chassis 302, and upon depression of the contact surfaces 318 of each latch assembly 310, engagement end portions 316 contact inner surfaces of opposed detents 240 of sub-pod chassis 302. The latch assemblies 310 therefore hold the processor cartridge assembly 300 in place within interior 232 of sub-pod chassis 202 and urge processor cartridge assembly 300 into interconnection with connectors 213A–213D (FIG. 9C).

Because the processor cartridge assemblies are removable and replaceable, the packaging configuration can be considered to be modular down to the processor level. In other words, the processors are removable/replaceable with respect to the sub-pods, the sub-pods are removable/replaceable with respect to the pods, and the pods are removable/replaceable with respect to the system's chassis.

Figure 13:
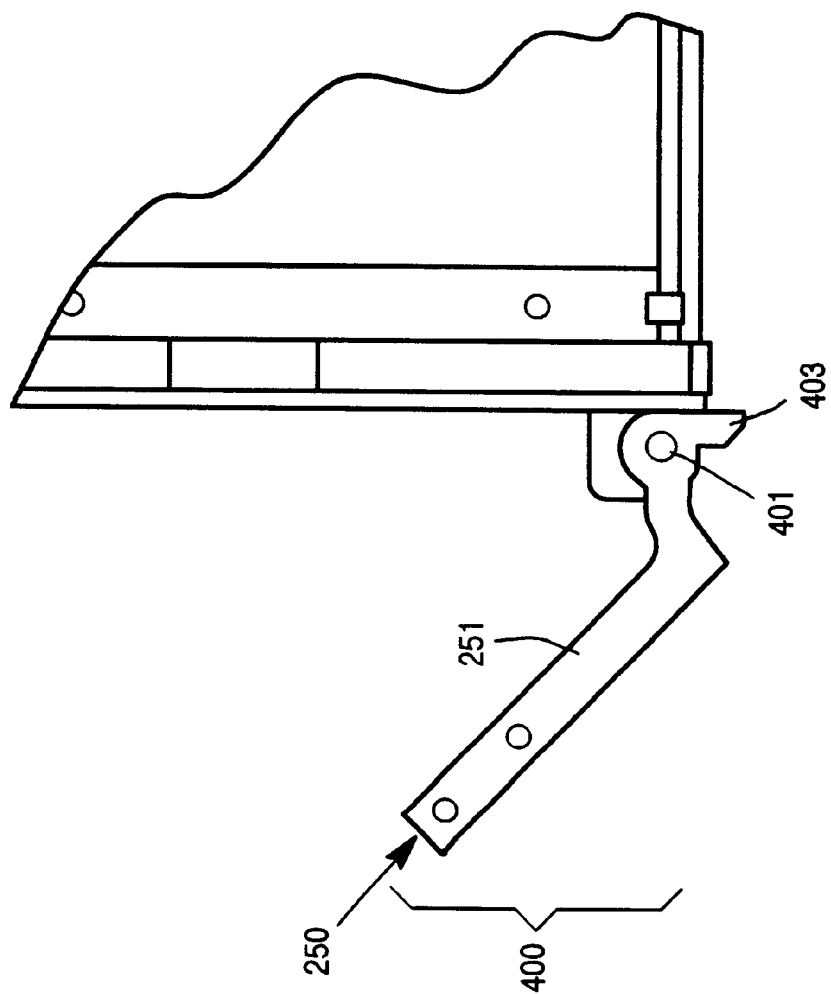
FIG. 13 is a right side view of an embodiment of a fastener assembly adapted for use with the chassis illustrated in FIG. 10F.

Referring now to FIG. 13, preferred features of a fastener assembly adapted for use in a packaging configuration according to this invention will be described. Generally, a fastener assembly according to this invention is adapted to engage two adjacent components for manual rotation with respect to one another about an axis, wherein the components each define an aperture and the apertures are aligned along the axis of rotation. The fastener assembly includes a support member contacting an outer surface of one of the components and having a support surface defining an aperture in substantially concentric arrangement with the aperture of the component. The fastener assembly also includes a fastener contacting an outer surface of the other component and having a body portion extending along the axis, through the apertures in the components, and through the aperture in the support member. An end portion of the fastener extends outwardly beyond the support surface of the support member, and the end portion is deformed into contact with the support surface of the support member. The fastener thereby engages the components and the support member with sufficient compression along the axis to resist unintended rotation of the components with respect to one another yet permit the manual rotation of the components when rotation is desired.

Referring now to FIG. 13, the fastener assembly 400 includes a lever 250 that is provided for pivotable movement with respect to the remainder of the subassembly or sub-pod chassis 202. Specifically, lever 250 is connected for pivotal movement about a pivot 401. Lever 250 includes a grasping portion 251 and an engagement member 403. The engagement member 403 is positioned and shaped to bear against an inner surface of stop bracket 148 (FIG. 7A) when sub-pod 200 is inserted fully into pod 100 and lever 250 is rotated to the right in FIG. 13 about pivot 401 from the disengaged position (FIG. 13) to an engaged position. Like the engagement members 145A and 145B of levers 144A and 144B (see FIG. 8A), engagement member 403 of lever 250 acts as a cam-like surface for urging sub-pod 200 into full engagement within pod 100. The action of lever 250 helps to bring about engagement between connector 212 on sub-pod 200 and connector 112A or 112B of pod 100 as the sub-pod is inserted into the pod. Accordingly, the lever 250 helps to generate the insertion force need to mate the connectors while reducing the pushing force that must be applied by the user to bring about interconnection.

Figure 14B:
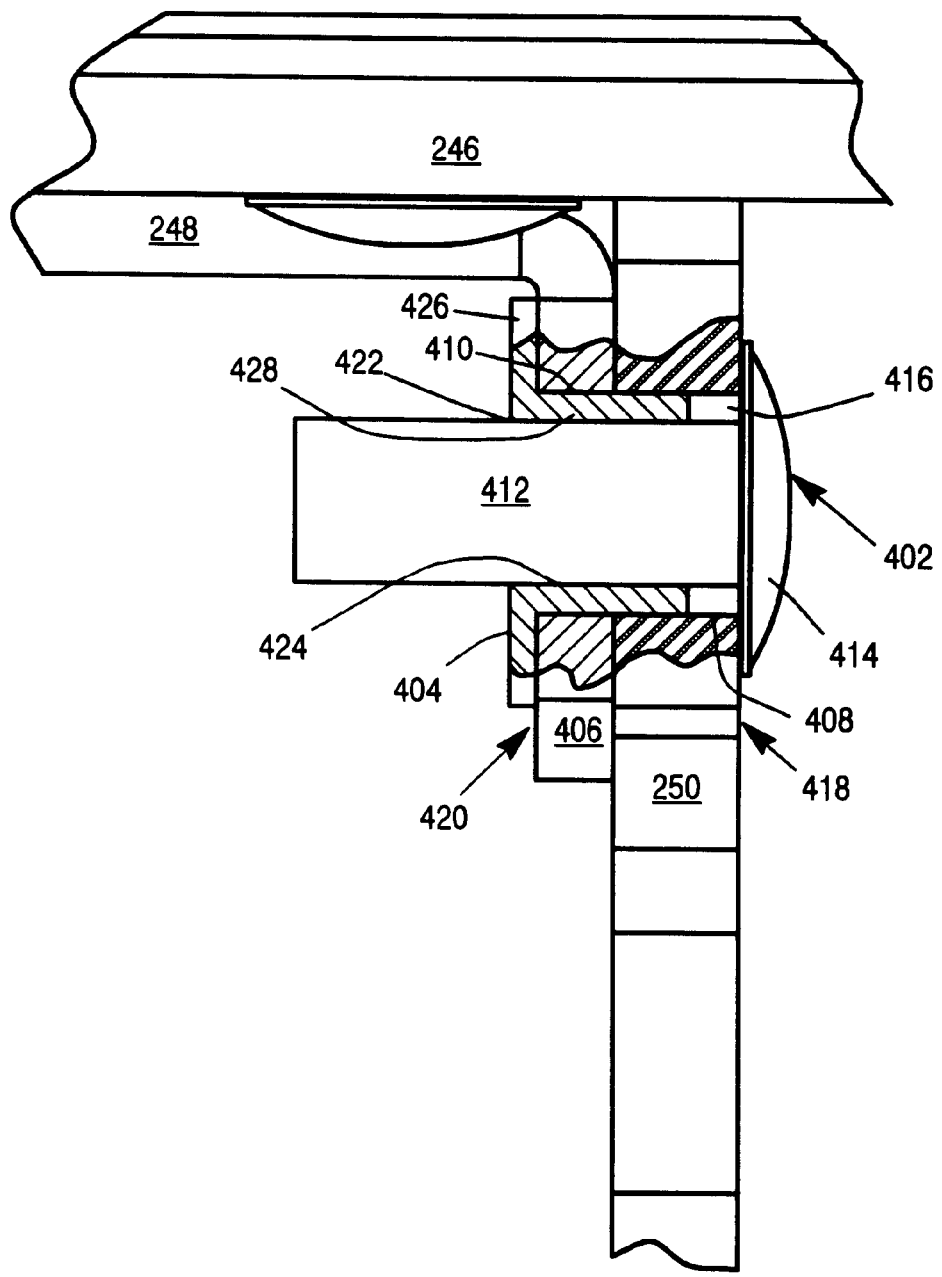
FIG. 14B is a cross-sectional top view of the fastener assembly illustrated in FIG. 14A.

Referring to the view provided in FIG. 14A as well as the cross-sectional view provided in FIG. 14B, fastener assembly 400 includes a fastener such as a rivet 402 and a support member such as a shoulder washer 404 in order to provide compressive engagement of a lever angle 248 connected to front plate 246 and a lever 250. As illustrated in FIG. 14B, a flange portion 406 of lever angle 248 is provided with a lever angle aperture 410 and lever 250 is provided with a lever aperture 408. Rivet 402 has a rivet body portion 412 and a rivet flange portion 414. Body portion 412 of rivet 402 extends through apertures 408 and 410, thereby forming an angular space 416 between an outer surface of body portion 412 and the inner surface of apertures 408 and 410. Rivet flange portion 414 bears against outer surface 418 of lever 250.

Figure 15B:
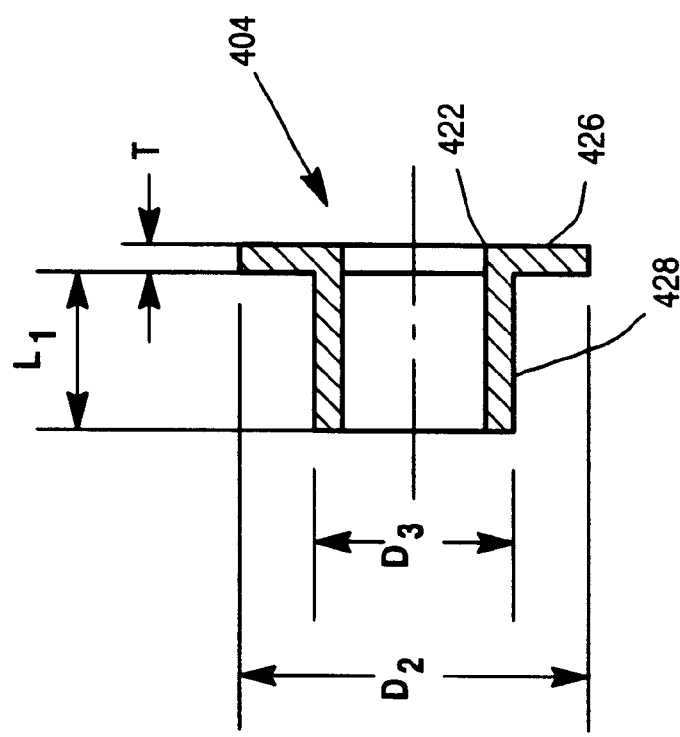
FIGS. 15A and 15B illustrate an embodiment of a support member adapted for use in the fastener assembly illustrated in FIGS. 14A and 14B.
Figure 15A:
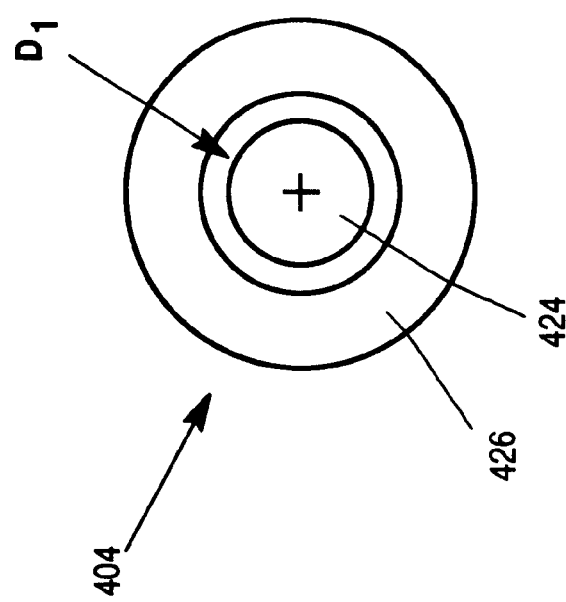

Shoulder washer 404 bears against an outer surface 420 of flange portion 406 of lever angle 248. Shoulder washer 404 is provided with a support surface 422 that defines a support member aperture 424 through which rivet body portion 412 extends. Shoulder washer 404 includes a flange portion 426 extending radially outwardly from the aperture axis for contact with the outer surface 420 of flange portion 406. Support body portion 428 of shoulder washer 404 extends at least partially through apertures 408 and 410 in the annular space 416 provided between an outer surface of rivet body portion 412 and the inner walls of the apertures. Further details of shoulder washer 404 are illustrated in FIGS. 15A and 15B. The flange 426 of shoulder washer 404 has a thickness "T" and an outer diameter "$D_2$" that is greater than the diameter of aperture 410 (FIG. 14B). Body 428 of shoulder washer 404 has a diameter "$D_3$" less than that of aperture 410 for insertion therein. Body 428 has a length "$L_1$" less than the combined thickness of lever 250 and lever angle flange portion 406. The diameter "$D_1$" of aperture 424 is greater than that of body portion 412 of rivet 402.

Figure 16:
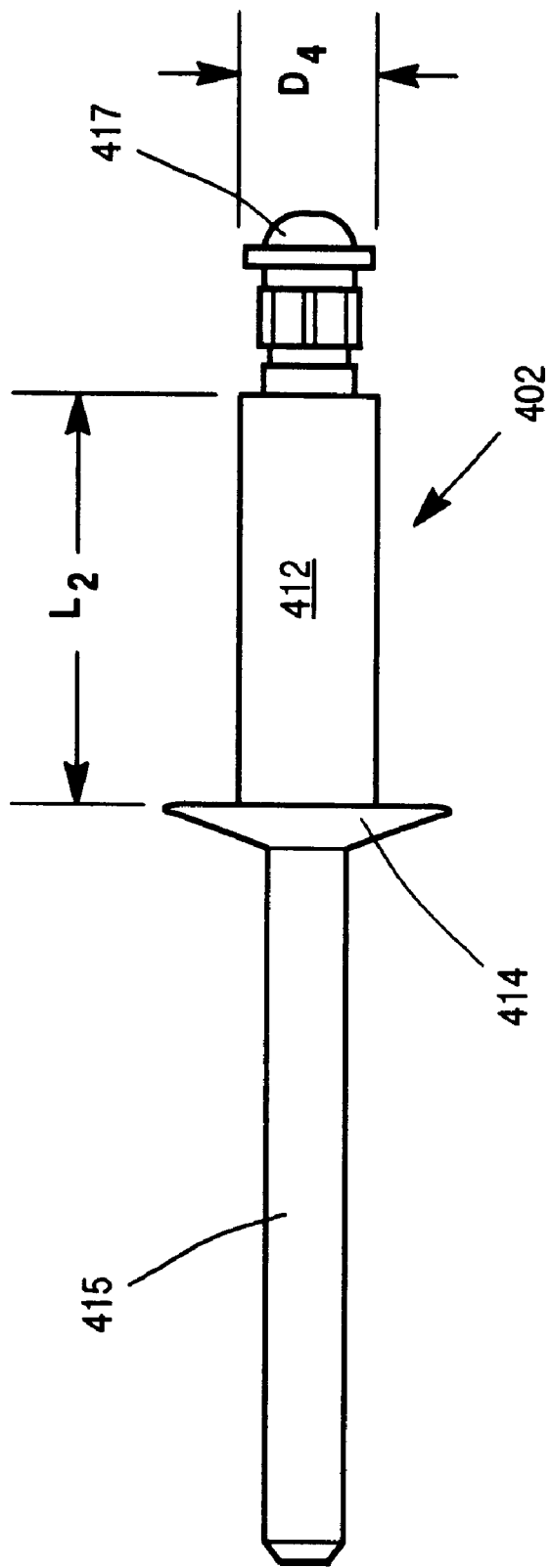
FIG. 16 is a side view of an embodiment of a fastener adapted for use in the fastener assembly illustrated in FIGS. 14A and 14B.

Referring now to FIG. 16, preferred aspects of rivet 402 are provided. Rivet 402 includes a body portion 412, a head portion 414, and a stem 415 that can be grasped by a manual rivet gun in order to deform an end portion of the body portion radially outwardly. More specifically, body portion 412 has a length "$L_2$" greater than that of the combined thickness of lever 250 and flange portion 406. As stem 415 is grasped and pulled to the left in FIG. 16, a ball 417 is drawn into the interior of body portion 412 and deforms the end of body portion radially outwardly. It is this deformation of the end portion of rivet 402 that causes engagement between the two rotationally mounted components. In other words, diameter "$D_4$" of body portion 412 is initially equal to or less than the diameter $D_1$ of the shoulder washer aperture 424. Upon deformation, the diameter $D_4$ at the end of body portion 412 is greater than diameter $D_1$ of aperture 424, thereby bringing about bearing contact with shoulder washer surface 422. The compressive force, in conjunction with the use of shoulder washer 404, provides sufficient engagement as between the adjacent components so that mutual rotation of the components will not occur unless a force is applied. At the same time, the compressive force is not so great as to prevent manual rotation of one of the components with respect to the other.

Although this invention has been described with respect to particular embodiments for the purpose of illustration, it will be appreciated that this invention is not limited to those embodiments and that a wide variety of modifications and variations can be made without departing from the spirit of this invention. Accordingly, the detailed description of this invention is not intended to limit the scope thereof; instead, the scope of the invention is separately defined in the claims that follow.

What is claimed:

1. A processor subassembly configured for releasable connection within a computer system having a chassis defining an opening and an interior and having a circuit board mounted in juxtaposition with said interior, said processor subassembly being configured for insertion into said opening of said chassis along an axis, said processor subassembly comprising:

a subassembly chassis at least partially defining a subassembly interior and a subassembly opening for access to said subassembly interior;

a subassembly circuit board mounted to said subassembly chassis and oriented to extend substantially parallel to said axis, said subassembly circuit board comprising a connector positioned adjacent an end portion of said subassembly circuit board for interconnection between said subassembly circuit board of said processor subassembly and said circuit board of said computer system; and a processor extending within said subassembly interior of said subassembly chassis and releasably connected to said subassembly circuit board;

said subassembly chassis being configured for insertion of said processor into said subassembly interior through said subassembly opening for releasable connection to said subassembly circuit board;

said subassembly chassis being configured for insertion into and removal from said computer system chassis along said axis to facilitate releasable interconnection between said subassembly circuit board and said circuit board of said computer system.

2. The processor subassembly recited in claim 1, said subassembly chassis extending longitudinally along said axis, said subassembly chassis being configured for said insertion into and removal from said computer system chassis along said axis.

3. The processor subassembly recited in claim 1, further comprising a support extending between wall portions of said subassembly chassis, said support comprising spaced support members positioned for contact with edge portions of said processor.

4. The processor subassembly recited in claim 3, said support of said subassembly chassis being oriented substantially perpendicular to said axis.

5. The processor subassembly recited in claim 3, said subassembly circuit board being mounted to said support.

6. The processor subassembly recited in claim 3, said subassembly opening defined in said subassembly chassis being positioned adjacent to said support for insertion of said processor into said subassembly interior in contact with said support and for releasable connection of said processor to said subassembly circuit board.

7. The processor subassembly recited in claim 6, further comprising a cover configured for releasable connection to said subassembly chassis in juxtaposition with said subassembly opening and positioned to limit said access to said subassembly interior.

8. The processor subassembly recited in claim 1, said end portion of said subassembly circuit board extending beyond an end portion of said subassembly chassis and outwardly from said subassembly interior of said subassembly chassis.

9. The processor subassembly recited in claim 1, wherein a plurality of processors extend within said subassembly interior of said subassembly chassis for releasable connection to said subassembly circuit board.

10. The processor subassembly recited in claim 1, said subassembly chassis having four sides and a substantially rectangular or square cross-sectional shape along said axis.

11. The processor subassembly recited in claim 10, said subassembly chassis comprising a wall portion extending along one of said sides of said subassembly chassis and an opposing wall portion extending along an opposite one of said sides of said subassembly chassis.

12. The processor subassembly recited in claim 11, said subassembly chassis comprising a partial wall portion along one of said sides, said partial wall portion defining said subassembly opening.

13. The processor subassembly recited in claim 12, said partial wall portion extending between said wall portion and said opposite wall portion, said wall, said partial wall, and said opposite wall portions being oriented along three adjacent sides of said subassembly chassis.

14. The processor subassembly recited in claim 13, wherein the remaining one of said sides of said subassembly chassis is substantially open.

15. The processor subassembly recited in claim 1, further comprising means for engaging a surface of said computer system chassis upon said insertion of said subassembly chassis into said computer system chassis.

16. The processor subassembly recited in claim 15, said engaging means comprising a lever rotationally mounted to said subassembly chassis.

17. A processor assembly configured for releasable connection within a computer system having a chassis defining an opening and an interior and having a circuit board mounted in juxtaposition with said interior, said processor assembly being configured for insertion into said opening of said chassis, said processor assembly comprising:

an assembly chassis at least partially defining an assembly interior and an assembly opening for access to said assembly interior;

an assembly circuit board mounted to said assembly chassis; and a processor subassembly configured for releasable connection with said assembly interior of said assembly chassis, said processor subassembly comprising (i) a subassembly chassis at least partially defining a subassembly interior; (ii) a subassembly circuit board mounted to said subassembly chassis and positioned at least partially within said subassembly interior of said subassembly chassis, said subassembly chassis being configured for insertion into and removal from said assembly interior of said assembly chassis through said assembly opening defined in said assembly chassis along an insertion axis; (iii) a subassembly connector mounted to said subassembly circuit board; and (iv) a plurality of processors extending within said subassembly interior of said subassembly chassis and connected to said subassembly circuit board;

said subassembly chassis being configured for insertion into and removal from said assembly interior of said assembly chassis through said assembly opening defined in said assembly chassis along an insertion axis; and subassembly chassis having a cross-sectional shape perpendicular to said insertion axis corresponding substantially to the shape of said assembly opening, thereby promoting alignment and interconnection of said subassembly connector and said assembly circuit board as said processor subassembly is inserted into said assembly interior of said assembly chassis.

18. The processor assembly recited in claim 17, said assembly opening in said assembly chassis and said cross-section shape of said subassembly chassis being square or rectangular.

19. The processor assembly recited in claim 17, said assembly chassis defining two assembly openings for access to said assembly interior, and said processor assembly comprising a processor subassembly configured for insertion into each of said assembly openings defined in said assembly chassis.

20. The processor assembly recited in claim 19, said assembly chassis further comprising a support mounted within said assembly interior, said support defining a boundary between said processor subassemblies.

21. The processor assembly recited in claim 17, further comprising means for engagement between said assembly chassis and said subassembly chassis and for preventing inadvertent removal of said processor subassembly from said assembly chassis.

22. The processor assembly recited in claim 21, said engagement means comprising a member rotationally mounted to said assembly chassis or said subassembly chassis for movement between an engaged position in contact with a surface of said subassembly chassis or said assembly chassis and a disengaged position.

23. The processor assembly recited in claim 22, said member comprising a lever rotationally mounted to said subassembly chassis, and said surface being provided by a bracket mounted to said assembly chassis, said lever being in contact with said bracket in said engaged position.

24. The processor assembly recited in claim 21, said engagement means being configured for urging said subassembly connector into interconnection with said assembly connector.

25. A processor assembly configured for releasable connection within a computer system having a chassis defining an opening and an interior and having a circuit board mounted in juxtaposition with said interior, said processor assembly being configured for insertion into said opening of said chassis, said processor assembly comprising:

an assembly chassis at least partially defining an assembly interior and an assembly opening for access to said assembly interior;

an assembly circuit board mounted to said assembly chassis; and a processor subassembly configured for releasable connection with said assembly interior of said assembly chassis, said processor subassembly comprising (i) a subassembly chassis at least partially defining a subassembly interior; (ii) a subassembly circuit board mounted to said subassembly chassis and positioned at least partially within said subassembly interior of said subassembly chassis, said subassembly chassis being configured for insertion into and removal from said assembly interior of said assembly chassis through said assembly opening defined in said assembly chassis along an insertion axis; (iii) a subassembly connector mounted to said subassembly circuit board; and (iv) a plurality of processors extending within said subassembly interior of said subassembly chassis and connected to said subassembly circuit board;

said subassembly chassis being configured for insertion into and removal from said assembly interior of said assembly chassis through said assembly opening defined in said assembly chassis along an insertion axis; and said subassembly chassis having a cross-sectional shape perpendicular to said insertion axis corresponding substantially to the shape of said assembly opening, thereby promoting alignment and interconnection of said subassembly connector and said assembly circuit board as said processor subassembly is inserted into said assembly interior of said assembly chassis;

said subassembly circuit board being oriented to extend substantially parallel to said insertion axis.

26. The processor assembly recited in claim 25, said subassembly connector being mounted at an end portion of said subassembly circuit board, and said assembly connector of said assembly circuit board being oriented toward said assembly opening defined in said assembly chassis for interconnection with said subassembly connector.

27. A processor assembly configured for releasable connection within a computer system having a chassis defining an opening and an interior and having a circuit board mounted in juxtaposition with said interior, said processor assembly being configured for insertion into said opening of said chassis, said processor assembly comprising:

an assembly chassis at least partially defining an assembly interior and an assembly opening for access to said assembly interior;

an assembly circuit board mounted to said assembly chassis; and a processor subassembly configured for releasable connection with said assembly interior of said assembly chassis, said processor subassembly comprising (i) a subassembly chassis at least partially defining a subassembly interior; (ii) a subassembly circuit board mounted to said subassembly chassis and positioned at least partially within said subassembly interior of said subassembly chassis, said subassembly chassis being configured for insertion into and removal from said assembly interior of said assembly chassis through said assembly opening defined in said assembly chassis along an insertion axis; (iii) a subassembly connector mounted to said subassembly circuit board; and (iv) a plurality of processors extending within said subassembly interior of said subassembly chassis and connected to said subassembly circuit board;

said subassembly chassis being configured for insertion into and removal from said assembly interior of said assembly chassis through said assembly opening defined in said assembly chassis along an insertion axis; and said subassembly chassis having a cross-sectional shape perpendicular to said insertion axis corresponding substantially to the shape of said assembly opening, thereby promoting alignment and interconnection of said subassembly connector and said assembly circuit board as said processor subassembly is inserted into said assembly interior of said assembly chassis;

said subassembly circuit board extending beyond an edge portion of said subassembly chassis and outwardly from said subassembly interior of said subassembly chassis.

28. The processor assembly recited in claim 27, said assembly chassis comprising a guide positioned for contact with an edge portion of said subassembly circuit board to promote alignment of said subassembly circuit board with respect to said assembly circuit board to facilitate interconnection between said subassembly connector and said subassembly connector.

29. The processor assembly recited in claim 28, said guide comprising spaced detents together defining a gap sized to slidingly accommodate said edge portion of said subassembly circuit board.

30. The processor assembly recited in claim 29, said spaced detents forming flanges together defining a channel sized to slidingly accommodate said edge portion of said subassembly circuit board.

31. A chassis assembly configured for releasable connection within a computer system having a computer system chassis defining an opening and an interior and having a computer system circuit board mounted in juxtaposition with said interior, said chassis assembly also being configured to receive a plurality of processor subassemblies each having a subassembly chassis and a subassembly circuit board, said chassis assembly comprising:

an assembly chassis at least partially defining an assembly interior and a plurality of assembly openings for access to said assembly interior, each of said assembly openings being configured to receive any one of the processor subassemblies; and an assembly circuit board mounted in juxtaposition with said assembly opening of said assembly chassis, said assembly circuit board comprising a computer system connector positioned on a surface of said assembly circuit board for connection to a computer system circuit board and a subassembly connector positioned on another surface of said assembly circuit board for connection to a subassembly circuit board;

said assembly chassis being configured for insertion into an opening of a computer system chassis for releasable connection between said computer system connector and a computer system circuit board;

said assembly chassis also being configured to receive in each said assembly opening a subassembly chassis for releasable connection between said subassembly connector and a subassembly circuit board.

32. The chassis assembly recited in claim 31, said assembly chassis comprising a guide positioned for contact with an edge portion of a subassembly circuit board to promote alignment of the subassembly circuit board with respect to said assembly circuit board to facilitate interconnection between the subassembly circuit board and said subassembly connector.

33. The chassis assembly recited in claim 32, said guide comprising spaced detents together defining a gap.

34. The chassis assembly recited in claim 33, said spaced detents forming flanges together defining a channel.

35. The chassis assembly recited in claim 31, said assembly chassis further comprising a support mounted within said assembly interior, said support defining a boundary between two portions of said assembly interior.

36. The chassis assembly recited in claim 31, said assembly chassis comprising side wall portions defining said assembly interior.

37. The chassis assembly recited in claim 31, said assembly opening being defined on one side of said assembly chassis and said assembly circuit board being positioned adjacent to an opposite side of said assembly chassis.

38. A packaging configuration for a computer system comprising:

a main chassis defining an opening and an interior and having a main circuit board mounted in juxtaposition with said interior;

a processor assembly having an assembly chassis configured for insertion into said interior of said main chassis through said opening of said main chassis, said assembly chassis defining an assembly opening and an assembly interior, said processor assembly also having an assembly circuit board mounted in juxtaposition with said assembly opening of said assembly chassis, said processor assembly being configured for making releasable interconnection between said assembly circuit board and said main circuit board upon insertion of said assembly chassis through said opening of said main chassis and into said interior of said main chassis;

a processor subassembly having a subassembly chassis configured for insertion into said assembly opening of said assembly chassis, said processor subassembly also having a subassembly circuit board, said processor subassembly being configured for making releasable interconnection between said subassembly circuit board and said assembly circuit board upon insertion of said subassembly chassis through said assembly opening of said assembly chassis and into said assembly interior of said assembly chassis; and at least one processor extending within said subassembly interior of said subassembly chassis and releasably connected to said subassembly circuit board.

39. A modular computer system comprising:

a chassis containing a memory storage unit mounted within an interior of said chassis;

a pod configured for insertion into said interior of said chassis and removal from said interior of said chassis, said pod comprising a pod chassis defining a pod interior and an electronic switch for connection to said memory storage unit in said chassis upon said insertion of said pod into said interior of said chassis;

a sub-pod configured for insertion into said pod interior of said pod chassis and removal from said pod interior of said pod chassis, said sub-pod comprising a processor and cache memory connected to said processor, said sub-pod being connected to said electronic switch of said pod upon said insertion of said sub-pod into said pod interior, said sub-pod being removable from said pod interior for disconnection from said electronic switch without powering down said computer system; and said pod being removable from said interior of said chassis for disconnection from said memory storage unit without powering down said computer system.

40. The computer system recited in claim 39, wherein two pods are configured for insertion into said interior of said chassis and removal from said interior of said chassis.

41. A processor subassembly comprising:
   a chassis at least partially defining an interior and an opening for access to said interior;
   a circuit board mounted in juxtaposition with said interior of said chassis;
      a processor mounted within said interior of said chassis and having an edge portion positioned for connection to said circuit board;
      a cover configured for releasable engagement to said chassis, said cover being positioned adjacent to said processor, said cover comprising an integral spring portion positioned for contact with said processor, said integral spring portion being configured to apply a compressive force against said processor, thereby urging said processor toward said circuit board to maintain said connection between said processor and said circuit board.

42. The processor subassembly recited in claim 41, said cover having a body, and said integral spring portion being deformed to extend from said body into said interior of said chassis.

43. The processor subassembly recited in claim 42, said integral spring portion being defined in part by a gap formed between an edge portion of said integral spring portion and said body of said cover.

44. The processor subassembly recited in claim 43, said integral spring portion being oriented at an acute angle with respect to said body of said cover by a bend formed between said integral spring portion and said body.

45. A method for use in a computer system having a plurality of processing modules and operating systems with a shared memory and housed in a chassis, comprising the steps of:
   providing at least one removable pod and receiving the pod within the chassis and removably electrically coupling the pod to the shared memory;
   providing at least one removable sub-pod each having a processing module and receiving the sub-pod within the pod and removably electrically coupling the sub-pod to the pod;
   configuring groups of at least one sub-pod as separate partitions within the computer system and assigning each of the separate partitions a separate one of the operating systems; and
   removing the at least one sub-pod of a group from a pod and thereby disabling the separate partition under which the removed sub-pod group operates without interruption of one of the operating systems on the remaining at least one separate partition.

46. A computer system having a plurality of processing modules and operating systems with a shared memory housed in a chassis, comprising:
   at least one removable pod received within said chassis and removably electrically coupled to said shared memory;
   at least one removable sub-pod having a processing module, said sub-pod being received within said pod and removably electrically coupled to said pod;
   groups of at least one sub-pod configured as separate partitions within the computer system, each of said separate partitions being assigned to a separate one of said operating systems; and
   means for disabling said separate partition under which a sub-pod group operates when said at least one sub-pod of the group is removed from the respective pod, or the respective pod is removed from the chassis, without interruption of the operating systems on said remaining at least one separate partition.

47. A modular computer system comprising:
   a chassis containing a memory storage unit mounted within an interior of said chassis;
   a pod configured for insertion into said interior of said chassis and removal from said interior of said chassis, said pod comprising a pod chassis defining a pod interior and an electronic switch for connection to said memory storage unit in said chassis upon said insertion of said pod into said interior of said chassis;
   a sub-pod configured for insertion into said pod interior of said pod and removal from said pod interior of said pod, said sub-pod comprising a processor and cache memory connected to said processor, said sub-pod being connected to said electronic switch in said pod upon said insertion of said sub-pod into said pod interior; and
   said pod being removable from said interior of said chassis for disconnection from said memory storage unit without powering down said computer system.

* * * * *